United States Patent
Lindsey et al.

(10) Patent No.: US 11,603,196 B2
(45) Date of Patent: Mar. 14, 2023

(54) METHODS AND SYSTEMS FOR ENERGY-EFFICIENT TAKE-OFFS AND LANDINGS FOR VERTICAL TAKE-OFF AND LANDING (VTOL) AERIAL VEHICLES

(71) Applicant: AeroVironment, Inc., Simi Valley, CA (US)

(72) Inventors: Quentin Lindsey, Canoga Park, CA (US); Henry Thome Won, Simi Valley, CA (US)

(73) Assignee: AEROVIRONMENT, INC., Arlington, VA (US)

( * ) Notice: Subject to any disclaimer, the term of this patent is extended or adjusted under 35 U.S.C. 154(b) by 260 days.

(21) Appl. No.: 16/259,289

(22) Filed: Jan. 28, 2019

(65) Prior Publication Data

US 2019/0233099 A1    Aug. 1, 2019

Related U.S. Application Data

(60) Provisional application No. 62/623,532, filed on Jan. 29, 2018.

(51) Int. Cl.
*B64C 29/02* (2006.01)
*G05D 1/08* (2006.01)
(Continued)

(52) U.S. Cl.
CPC .......... *B64C 29/02* (2013.01); *G05D 1/0202* (2013.01); *G05D 1/0669* (2013.01);
(Continued)

(58) Field of Classification Search
CPC ............... B64C 29/02; B64C 2201/18; B64C 2201/08; B64C 29/00; B64C 29/0008;
(Continued)

(56) References Cited

U.S. PATENT DOCUMENTS

| 3,089,671 A | 5/1963 | Treffeisen |
| 2007/0057113 A1 | 3/2007 | Parks |
| 2011/0184593 A1 | 7/2011 | Swope |
| (Continued) | | |

FOREIGN PATENT DOCUMENTS

WO    2013048339 A1    4/2013

OTHER PUBLICATIONS

Skybrary' definition of stall speed; https://skybrary.aero/articles/stall-speed-vs, Publish date according to google: Apr. 12, 2017 (Year: 2017).*
Federal Aviation Administration, FAA), DOT. 1-g Stall Speed as the Basis for Compliance With Part 25 of the Federal Aviation Regulations, Nov. 26, 2002 (Year: 2002).*
International Search Report and Written Opinion for PCT/US2019/015392 dated Apr. 12, 2019.
(Continued)

*Primary Examiner* — Christian Chace
*Assistant Examiner* — Jordan S Fei
(74) *Attorney, Agent, or Firm* — Concept IP LLP; Michael Zarrabian; Eric Aagaard

(57) ABSTRACT

Systems, devices, and methods that may include: determining one or more take-off variables for a vertical take-off and landing (VTOL) aerial vehicle; increasing an altitude of the VTOL aerial vehicle to a first altitude, where increasing the altitude comprises substantially vertical flight of the VTOL aerial vehicle; performing a first pre-rotation check of the VTOL aerial vehicle; adjusting a pitch of the VTOL aerial vehicle to a first pitch angle via motor control; adjusting the pitch of the VTOL aerial vehicle to a second pitch angle via at least one of: motor control and one or more effectors; and adjusting the pitch of the VTOL aerial vehicle to a third pitch angle via the one or more effectors, where the third pitch angle is substantially perpendicular to a vertical plane.

16 Claims, 9 Drawing Sheets

(51) Int. Cl.
*G05D 1/02* (2020.01)
*G05D 1/06* (2006.01)

(52) U.S. Cl.
CPC .......... *G05D 1/0808* (2013.01); *G05D 1/0816* (2013.01); *B64C 2201/021* (2013.01); *B64C 2201/08* (2013.01); *B64C 2201/104* (2013.01); *B64C 2201/108* (2013.01); *B64C 2201/146* (2013.01); *B64C 2201/18* (2013.01)

(58) Field of Classification Search
CPC ............ B64C 29/0016; B64C 29/0025; B64C 29/0033; B64C 29/0041; B64C 29/005; B64C 29/0058; B64C 29/0066; B64C 29/0075; B64C 29/0083; B64C 29/0091; B64C 29/04; G05D 1/0816; G05D 1/0669; G05D 1/0808; G05D 1/0202; G05D 1/102; G05D 1/0858; F05D 2220/90
See application file for complete search history.

(56) References Cited

U.S. PATENT DOCUMENTS

| | | |
|---|---|---|
| 2015/0336671 A1* | 11/2015 | Winn .................. G05D 1/0094 701/3 |
| 2016/0207617 A1 | 7/2016 | Sada-Salinas |
| 2016/0244159 A1 | 8/2016 | Bevirt |
| 2016/0272313 A1* | 9/2016 | Chan ..................... B64C 27/08 |
| 2017/0068252 A1* | 3/2017 | Yu .......................... B64C 15/00 |
| 2017/0259917 A1 | 9/2017 | Winn et al. |
| 2018/0218621 A1* | 8/2018 | Canale ................ G08G 5/0091 |
| 2019/0023385 A1* | 1/2019 | Nguyen ................ B64D 31/00 |
| 2019/0118943 A1* | 4/2019 | Machin ................ B64C 39/024 |

OTHER PUBLICATIONS

"Wang Kangli et al: reconfigurable hybrid tail-sitter UAV U- Lion", Science China Information Sciences, Science China Press, Heidelberg, vol. 60, No. 3, Feb. 14, 2017 (Feb. 14, 2017), pp. 1-16, XP036181428, ISSN: 1674-733X, DOI: 10.1007/S11432-016-9002-X.

* cited by examiner

METHODS AND SYSTEMS FOR ENERGY-EFFICIENT TAKE-OFFS AND LANDINGS FOR VERTICAL TAKE-OFF AND LANDING (VTOL) AERIAL VEHICLES

CROSS-REFERENCE TO RELATED APPLICATION

This application claims the priority benefit of U.S. Provisional Patent Application Ser. No. 62/623,532 filed Jan. 29, 2018, incorporated herein by reference in its entirety

FIELD OF ENDEAVOR

The invention relates to take-off and landing for aerial vehicles, and more particularly to take-off and landing for vertical take-off and landing (VTOL) aerial vehicles.

BACKGROUND

Vertical take-off and landing (VTOL) aerial vehicles may take-off vertically, transition from vertical flight to horizontal flight, and fly forward horizontally. As VTOL aerial vehicles have grown in size and complexity, the power demands required for take-off and landings are increased.

SUMMARY

In one embodiment, a method disclosed herein may include: determining, by a processor having addressable memory, one or more take-off variables for a vertical take-off and landing (VTOL) aerial vehicle; increasing, by the processor, an altitude of the VTOL aerial vehicle to a first altitude, where increasing the altitude may include sending a signal to one or more motors to produce thrust, and where increasing the altitude may involve substantially vertical flight of the VTOL aerial vehicle; performing, by the processor, a first pre-rotation check of the VTOL aerial vehicle; adjusting, by the processor, a pitch of the VTOL aerial vehicle to a first pitch angle via motor control; adjusting, by the processor, the pitch of the VTOL aerial vehicle to a second pitch angle via at least one of: motor control and one or more effectors; and adjusting, by the processor, the pitch of the VTOL aerial vehicle to a third pitch angle via the one or more effectors, where the third pitch angle may be substantially perpendicular to a vertical plane.

In additional method embodiments, the one or more take-off variables may include at least one of: a vertical ascent speed, a pitch adjustment rate, a final pitch angle, a horizontal ascent speed, a minimum transition height above ground, a final altitude, a minimum airspeed for horizontal flight, a wind speed, and/or a wind direction. Additional method embodiments may include, prior to increasing altitude to the first altitude: performing, by the processor, a pre-launch check of the VTOL aerial vehicle, where the pre-launch check may include a test of at least one of: the one or more motors and one or more batteries. In some embodiments, the pre-rotation check may include a test of at least one of: the one or more motors, the one or more batteries, and a speed of the VTOL aerial vehicle. Additional method embodiments may include: landing, by the processor, the VTOL aerial vehicle via adjusting thrust to the one or more motors if the test of at least one of: the one or more motors, the one or more batteries, and a speed of the VTOL aerial vehicle is failed.

In additional method embodiments, adjusting the pitch to the first pitch angle may include adjusting thrust to the one or more motors to cause a rotation of the VTOL aerial vehicle. In additional method embodiments, adjusting the pitch to the second pitch angle may include adjusting thrust to the one or more motors and adjusting a position of the one or more effectors to cause the rotation of the VTOL aerial vehicle. In additional method embodiments, adjusting the pitch to the third pitch angle may include adjusting the position of the one or more effectors to cause the rotation of the VTOL aerial vehicle.

Additional method embodiments may include: performing, by the processor, a stability check of the VTOL aerial vehicle, where the stability check may verify that the VTOL aerial vehicle is stable prior to performing one or more maneuvers. Additional method embodiments may include: executing, by the processor, one or more mission plans, where the one or more mission plans may include at least one of: increasing elevation, decreasing elevation, and imaging one or more fields. Additional method embodiments may include: determining, by the processor, one or more landing variables for the VTOL aerial vehicle, where the one or more take-off variables may include at least one of: a vertical descent speed, a pitch adjustment rate, a final pitch angle, a horizontal descent speed, a maximum transition height above ground, a landing point, a wind speed, and a wind direction.

Additional method embodiments may include: decreasing, by the processor, altitude of the VTOL aerial vehicle to a second altitude, where decreasing the altitude may include sending a signal to at least one of: the one or more motors to produce thrust and the one or more effectors to change position; adjusting, by the processor, the pitch of the VTOL aerial vehicle to a fourth pitch angle via the one or more effectors, where adjusting the pitch to the fourth pitch angle may include adjusting the position of the one or more effectors to cause the rotation of the VTOL aerial vehicle; adjusting, by the processor, the pitch of the VTOL aerial vehicle to a fifth pitch angle via at least one of: motor control and one or more effectors, where adjusting the pitch to the fifth pitch angle may include adjusting thrust to the one or more motors and adjusting a position of the one or more effectors to cause the rotation of the VTOL aerial vehicle; and adjusting, by the processor, the pitch of the VTOL aerial vehicle to a sixth pitch angle via motor control, where adjusting the pitch to the sixth pitch angle may include adjusting thrust to the one or more motors to cause the rotation of the VTOL aerial vehicle, where the sixth pitch angle may be substantially perpendicular to a horizontal plane. Additional method embodiments may include: orienting, by the processor, a wing of the VTOL aerial vehicle relative to a wind direction, where orienting the wing of the VTOL aerial vehicle may include adjusting thrust to the one or more motors, and where a plane corresponding to the wing of the VTOL aerial vehicle may be oriented substantially perpendicular to the wind direction. Additional method embodiments may include: translating, by the processor, the VTOL aerial vehicle to a landing location, where translating the VTOL aerial vehicle may include adjusting thrust to the one or more motors. Additional method embodiments may include: decreasing, by the processor, the altitude of the VTOL aerial vehicle to the landing location, where decreasing the altitude of the VTOL aerial vehicle may include adjusting thrust to the one or more motors.

A system embodiment may include: a vertical take-off and landing (VTOL) aerial vehicle, the VTOL aerial vehicle including: one or more motors; one or more effectors; and a processor having addressable memory, the processor in communication with the one or more motors and the one or more effectors, the processor configured to: determine one or more take-off variables for the VTOL aerial vehicle; increase an altitude of the VTOL aerial vehicle to a first altitude, where increasing the altitude may include sending a signal to one or more motors to produce thrust, and where increasing the altitude may include substantially vertical flight of the VTOL aerial vehicle; perform a first pre-rotation check of the VTOL aerial vehicle; adjust a pitch of the VTOL aerial vehicle to a first pitch angle via motor control; adjust the pitch of the VTOL aerial vehicle to a second pitch angle via at least one of: motor control of the one or more motors and control of the one or more effectors; and adjust the pitch of the VTOL aerial vehicle to a third pitch angle via the one or more effectors, where the third pitch angle may be substantially perpendicular to a vertical plane.

In additional system embodiments, the VTOL aerial vehicle may be an unmanned aerial vehicle. In additional system embodiments, the one or more take-off variables may include at least one of: a vertical ascent speed, a pitch adjustment rate, a final pitch angle, a horizontal ascent speed, a minimum transition height above ground, a final altitude, a minimum airspeed for horizontal flight, a wind speed, and/or a wind direction. In additional system embodiments, the processor may be further configured to: decrease altitude of the VTOL aerial vehicle to a second altitude, where decreasing the altitude may include sending a signal to at least one of: the one or more motors to produce thrust and the one or more effectors to change position; adjust the pitch of the VTOL aerial vehicle to a fourth pitch angle via the one or more effectors, where adjusting the pitch to the fourth pitch angle may include adjusting the position of the one or more effectors to cause the rotation of the VTOL aerial vehicle; adjust the pitch of the VTOL aerial vehicle to a fifth pitch angle via at least one of: motor control and one or more effectors, where adjusting the pitch to the fifth pitch angle may include adjusting thrust to the one or more motors and/or adjusting a position of the one or more effectors to cause the rotation of the VTOL aerial vehicle; and adjust the pitch of the VTOL aerial vehicle to a sixth pitch angle via motor control, where adjusting the pitch to the sixth pitch angle may include adjusting thrust to the one or more motors to cause the rotation of the VTOL aerial vehicle, where the sixth pitch angle may be substantially perpendicular to a horizontal plane.

Another method embodiment may include: determining, by a processor having addressable memory, one or more take-off variables for a vertical take-off and landing (VTOL) aerial vehicle, where the one or more take-off variables may include at least one of: a vertical ascent speed, a pitch adjustment rate, a final pitch angle, a horizontal ascent speed, a minimum transition height above ground, a final altitude, a minimum airspeed for horizontal flight, a wind speed, and/or a wind direction; performing, by the processor, a pre-launch check of the VTOL aerial vehicle, where the pre-launch check may include a test of at least one of: one or more motors and one or more batteries; increasing, by the processor, an altitude of the VTOL aerial vehicle to a first altitude, where increasing the altitude may include sending a signal to the one or more motors to produce thrust; performing, by the processor, a first pre-rotation check of the VTOL aerial vehicle, where the pre-rotation check comprises a test of at least one of: the one or more motors, the one or more batteries, and a speed of the VTOL aerial vehicle; adjusting, by the processor, a pitch of the VTOL aerial vehicle to a first pitch angle via motor control, where adjusting the pitch to the first pitch angle may include adjusting thrust to the one or more motors to cause a rotation of the VTOL aerial vehicle; adjusting, by the processor, the pitch of the VTOL aerial vehicle to a second pitch angle via at least one of: motor control and one or more effectors, where adjusting the pitch to the second pitch angle may include adjusting thrust to the one or more motors and adjusting a position of the one or more effectors to cause the rotation of the VTOL aerial vehicle; adjusting, by the processor, the pitch of the VTOL aerial vehicle to a third pitch angle via the one or more effectors, where adjusting the pitch to the third pitch angle may include adjusting the position of the one or more effectors to cause the rotation of the VTOL aerial vehicle; performing, by the processor, a stability check of the VTOL aerial vehicle, where the stability check may verify that the VTOL aerial vehicle is stable prior to performing one or more maneuvers; executing, by the processor, one or more mission plans, where the one or more mission plans may include at least one of: increasing elevation, decreasing elevation, and imaging one or more fields; determining, by the processor, one or more landing variables for the VTOL aerial vehicle, where the one or more landing variables may include at least one of: a vertical descent speed, a pitch adjustment rate, a final pitch angle, a horizontal descent speed, a maximum transition height above ground, a landing point, a wind speed, and a wind direction; performing, by the processor, a pre-landing check of the VTOL aerial vehicle, where the pre-landing check may include a test of at least one of: the one or more motors and the one or more batteries; decreasing, by the processor, altitude of the VTOL aerial vehicle to a second altitude, where decreasing the altitude may include sending a signal to at least one of: the one or more motors to produce thrust and the one or more effectors to change position; performing, by the processor, a second pre-rotation check of the VTOL aerial vehicle, where the pre-rotation check may include a test of at least one of: the one or more motors, the one or more batteries, and a speed of the VTOL aerial vehicle; adjusting, by the processor, the pitch of the VTOL aerial vehicle to a fourth pitch angle via the one or more effectors, where adjusting the pitch to the fourth pitch angle may include adjusting the position of the one or more effectors to cause the rotation of the VTOL aerial vehicle; adjusting, by the processor, the pitch of the VTOL aerial vehicle to a fifth pitch angle via at least one of: motor control and one or more effectors, where adjusting the pitch to the fifth pitch angle may include adjusting thrust to the one or more motors and adjusting a position of the one or more effectors to cause the rotation of the VTOL aerial vehicle; adjusting, by the processor, the pitch of the VTOL aerial vehicle to a sixth pitch angle via motor control, where adjusting the pitch to the sixth pitch angle may include adjusting thrust to the one or more motors to cause the rotation of the VTOL aerial vehicle; orienting, by the processor, a wing of the VTOL aerial vehicle relative to a wind direction, where orienting the wing of the VTOL aerial vehicle may include adjusting thrust to the one or more motors, and where a plane corresponding to the wing of the VTOL aerial vehicle may be oriented substantially perpendicular to the wind direction; translating, by the processor, the VTOL aerial vehicle to a landing location, where translating the VTOL aerial vehicle may include adjusting thrust to the one or more motors; and decreasing, by the processor, the altitude of the VTOL aerial vehicle to the landing location, where decreasing the altitude of the VTOL aerial vehicle may include adjusting thrust to the one or more motors.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

Figure 1:
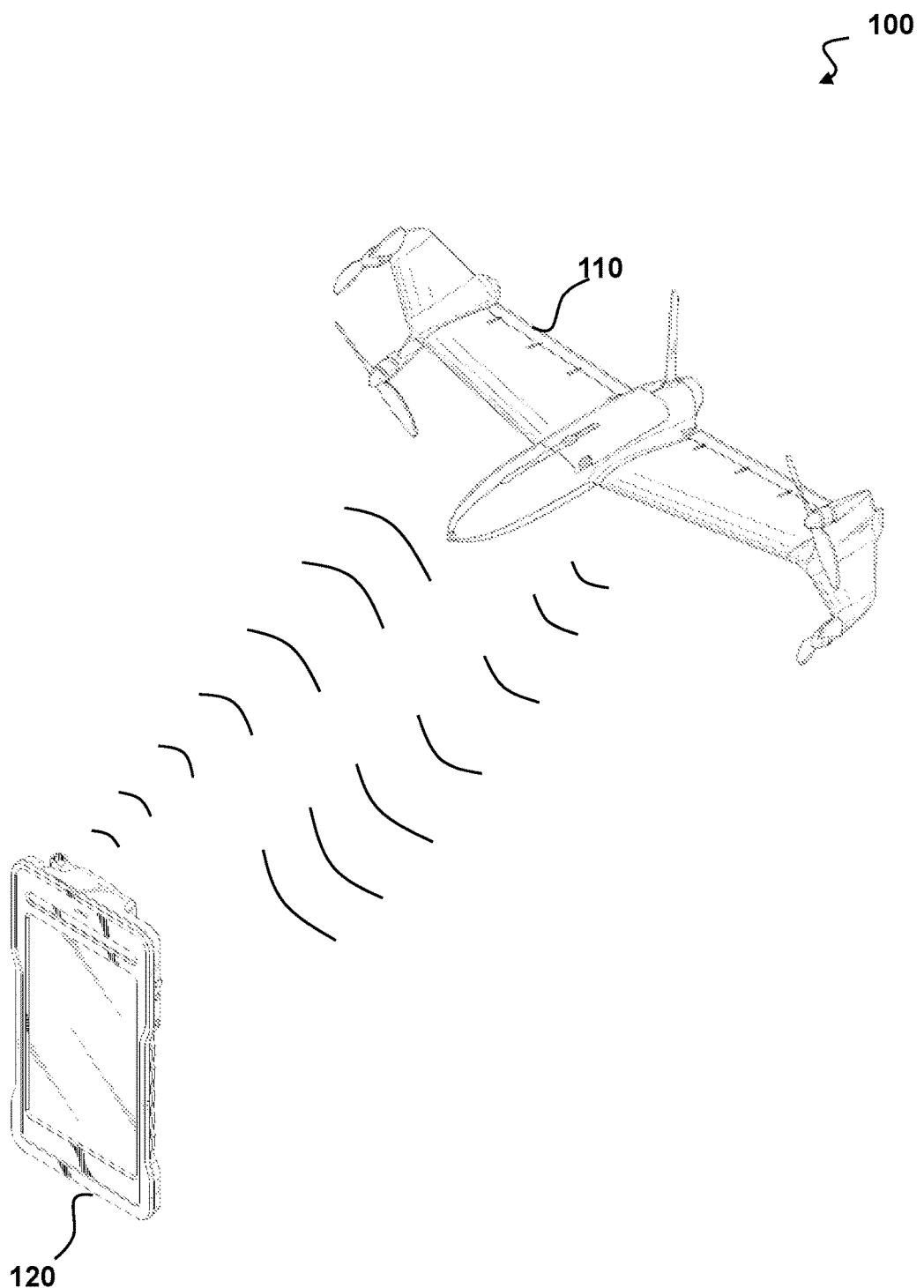
FIG. 1 depicts an air vehicle system having an air vehicle controlled by a ground control station, according to one embodiment.

The following description is made for the purpose of illustrating the general principles of the embodiments discloses herein and is not meant to limit the concepts disclosed herein. Further, particular features described herein can be used in combination with other described features in each of the various possible combinations and permutations. Unless otherwise specifically defined herein, all terms are to be given their broadest possible interpretation including meanings implied from the description as well as meanings understood by those skilled in the art and/or as defined in dictionaries, treatises, etc.

The disclosed system and method provides for energy-efficient take-off and landing by a vertical take-off and landing (VTOL) aerial vehicle. The VTOL aerial vehicle may be capable of vertical flight, hovering, and horizontal flight. VTOL aerial vehicles may be designed to be more efficient in one flying mode than another. For example, a VTOL aerial vehicle that is expected to spend a majority of the time in horizontal flight may be optimized for horizontal flight. Accordingly, vertical flight or hovering may be far less efficient than horizontal flight, such as about four times less efficient. Accordingly, the disclosed system and method reduces time spent in these inefficient modes while ensuring safe take-off and landing.

Methods and processes for energy-efficient take-offs and landings for VTOL aerial vehicles allow for an orientation transition at more optimal times, and minimizes the time a VTOL aerial vehicle is in an energy-inefficient orientation. In a number of embodiments, the method includes orienting a vertical take-off and landing (VTOL) aerial vehicle for take-off, determining a selected transition height above ground for transitioning the VTOL aerial vehicle from a first orientation to a second orientation, the selected transition height above ground is determined based on parameters associated with reducing duration of the first orientation during take-off, determining a final altitude, increasing altitude of the VTOL aerial vehicle in the first orientation, upon reaching the selected transition height above ground, transitioning the orientation of the VTOL aerial vehicle from the first orientation to the second orientation, an increasing altitude of the VTOL aerial vehicle in the second orientation to the final altitude.

In another embodiment, the selected transition height above ground comprises a minimum transition height above ground. In a further embodiment, the minimum transition height above ground minimizes duration of the first orientation for the VTOL aerial vehicle during take-off. In many embodiments, the method includes orienting a vertical take-off and landing (VTOL) aerial vehicle for take-off, determining a selected transition height above ground for transitioning the VTOL aerial vehicle from a vertical orientation to a horizontal orientation, the selected transition height above ground is determined based on parameters associated with reducing duration of the vertical orientation during take-off, determining a final altitude, increasing altitude of the VTOL aerial vehicle in the vertical orientation, upon reaching the selected transition height above ground, transitioning the orientation of the VTOL aerial vehicle from the vertical orientation to the horizontal orientation, and increasing altitude of the VTOL aerial vehicle in the horizontal orientation until the final altitude has been reached.

In a still further embodiment, the selected transition height above ground comprises a minimum transition height above ground. In yet another embodiment, the minimum transition height above ground minimizes the amount of time the VTOL aerial vehicle will spend in the vertical orientation during take-off.

Figure 9:
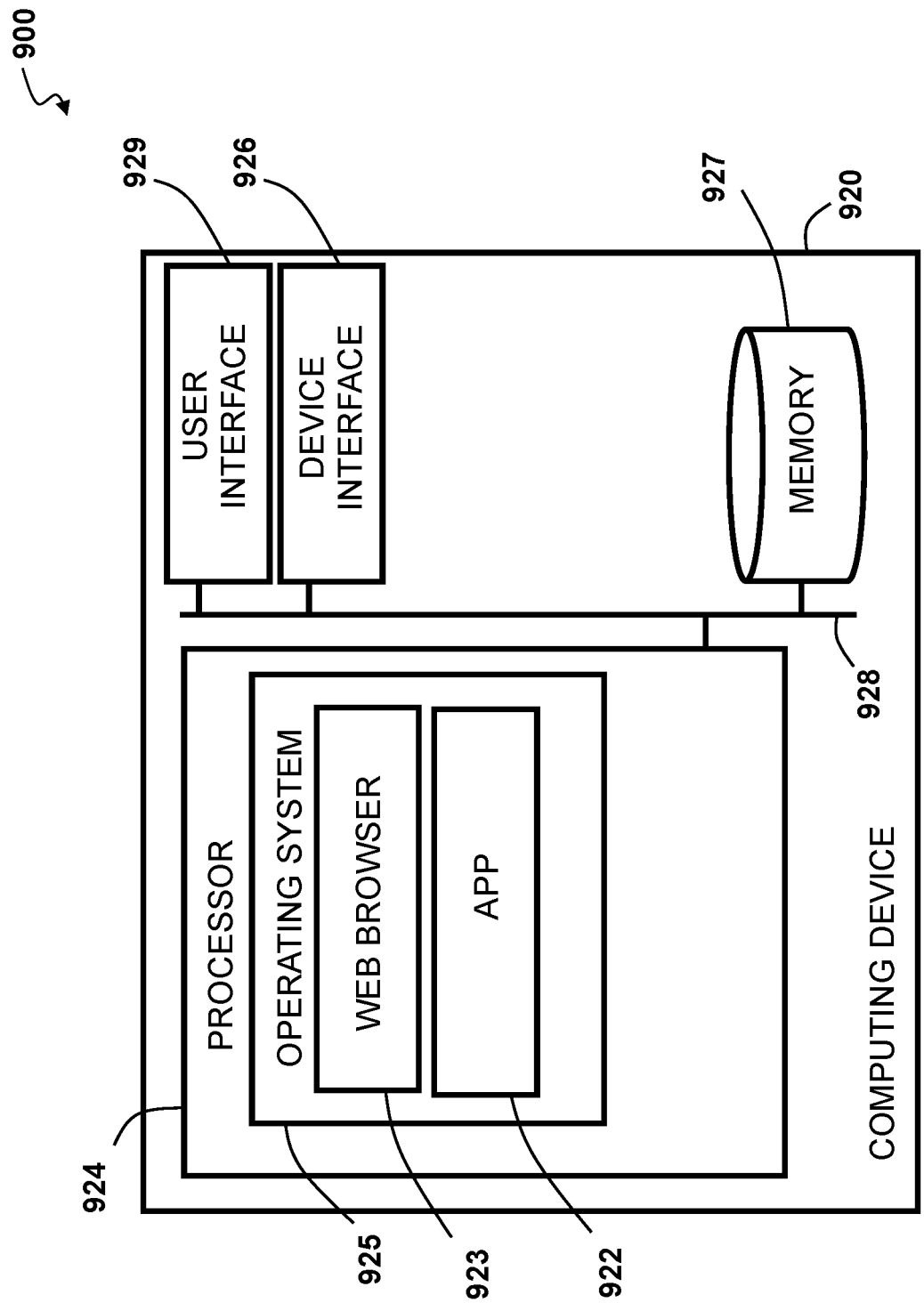
FIG. 9 illustrates a top-level functional block diagram of a computing device embodiment of an imaging system.

FIG. 1 depicts an air vehicle system 100 having an air vehicle 110 controlled by a ground control station 120, according to one embodiment. The air vehicle 100 is shown in FIG. 1 in a horizontal orientation, such as it would be positioned during forward flight. The ground control station 120 can operate the air vehicle 100 motors through control surfaces via an on-board control system. Operation of the motors can apply both forces and torque to the air vehicle 100. In many embodiments, the ground control station 120 may communicate with the air vehicle 110 to initiate a takeoff routine. The air vehicle 110 may include one or more processors having addressable memory, as shown in FIG. 9, to execute the steps shown in the disclosed system and method. The ground control station 120 may include one or more processors having addressable memory, as shown in FIG. 9, to execute the steps shown in the disclosed system and method.

Figure 2:
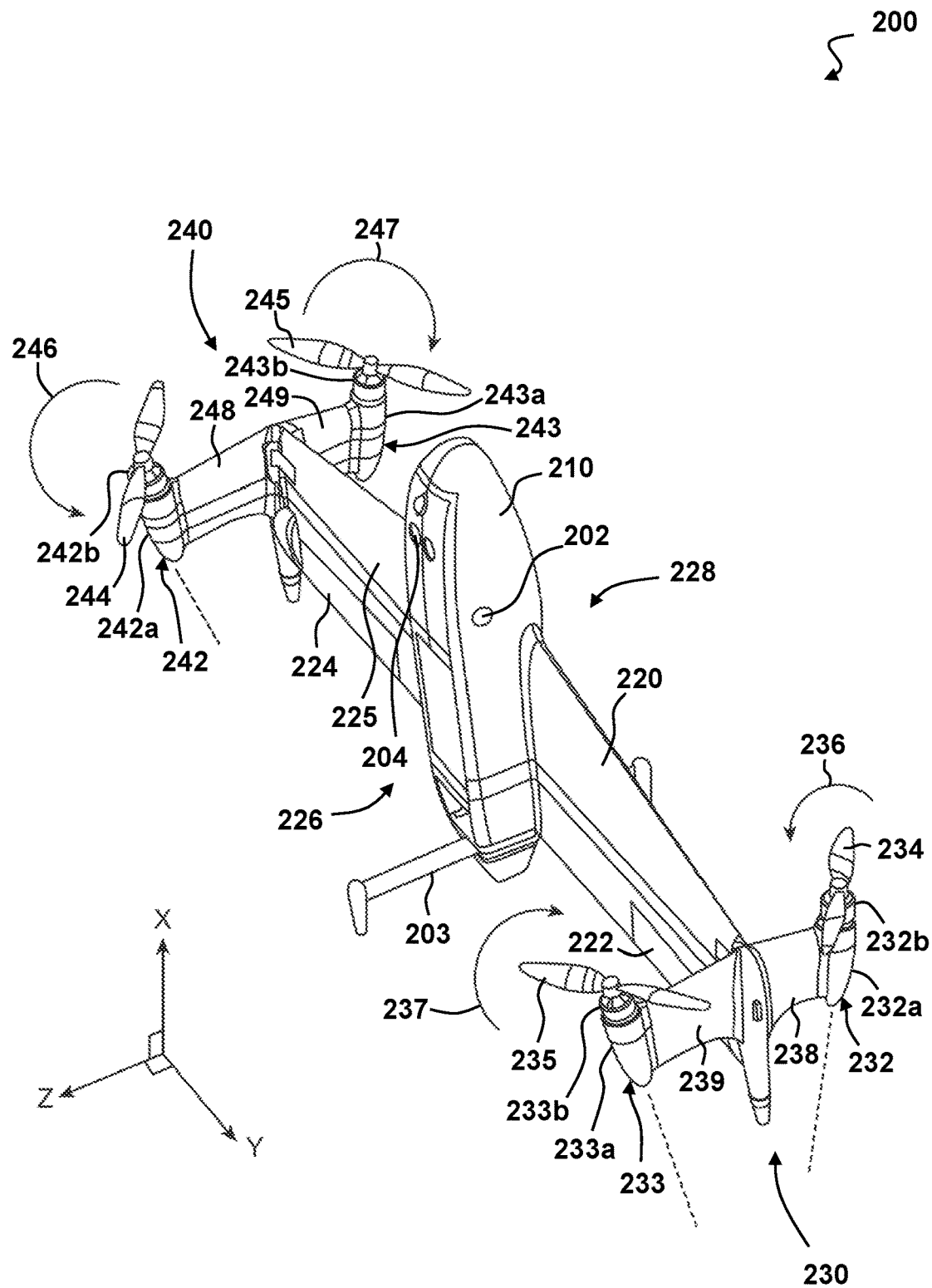
FIG. 2 depicts a perspective view of an embodiment of a vertical take-off and landing (VTOL) aerial vehicle, according to one embodiment.

FIG. 2 depicts a perspective view of an embodiment of a vertical take-off and landing (VTOL) aerial vehicle 200, according to one embodiment. The aerial vehicle 200 may be capable of vertical take-off and landing, hovering, vertical flight, maneuvering in a vertical orientation, transitioning between vertical and horizontal flight, and maneuvering in a horizontal orientation during forward flight. The aerial vehicle 200 may be controlled by an on-board control system that adjusts thrust to each of the motors 232*b*, 233*b*, 242*b*, 243*b* and control surfaces 222, 224. The on-board control system may include a processor having addressable memory and may apply differential thrust of the motors 232*b*, 233*b*, 242*b*, 243*b* to apply both forces and torque to the aerial vehicle 200.

The aerial vehicle 200 includes a fuselage 210 and a wing 220 extending from both sides of the fuselage 210. The wing 220 may include control surfaces 222, 224 positioned on either side of the fuselage 210. In some embodiments, the wing 220 may not include any control surfaces to reduce weight and complexity. A top side or first side 228 of the wing 220 may be oriented upwards relative to the ground during horizontal flight. A bottom side or second side 226 of the wing 220 may be oriented downwards relative to the ground during horizontal flight. The wing 220 is positioned in and/or about a wing plane 225. The wing plane 225 may be parallel to an x-y plane defined by the x-y-z coordinate system as shown in FIG. 2, where the x-direction is towards a longitudinal axis of aerial vehicle 200 and the y-direction is towards a direction out along the wing 220. The wing 220 may generally lie and/or align to the wing plane 225. In some embodiments, the wing 220 may define or otherwise have a planform of the wing that defines a plane that the wing is positioned at least symmetrically about.

One or more sensors 204 may be disposed in the fuselage 210 of the aerial vehicle 200 on the second side 226 to capture data during horizontal forward flight. The sensor 204 may be a camera, and any images captured during flight of the aerial vehicle 200 may be stored and/or transmitted to an external device. The sensor 204 may be fixed or pivotable relative to the fuselage 210 of the aerial vehicle 200. In some embodiments, the sensors 204 may be swapped based on the needs of a mission, such as replacing a LIDAR with an infrared camera for nighttime flights. In a number of embodiments, the sensors 204 may be capable of acquiring data that allows for a three-hundred-sixty-degree view of the surroundings of the aerial vehicle 200.

The aerial vehicle 200 is depicted in a vertical orientation, as it would be positioned on the ground prior to take-off or after landing. Landing gear 203 may maintain the aerial vehicle 200 in this vertical orientation. In some embodiments, the landing gear 203 may act as a vertical stabilizer during horizontal forward flight of the aerial vehicle 200.

A first motor assembly 230 is disposed at a first end or tip of the wing 220 distal from the fuselage 210. The first motor assembly 230 includes a pair of motor pods 232, 233 including pod structures 232a, 233a and motors 232b, 233b; winglets 238, 239; and propellers 234, 235. A top port motor pod 232 may include a top port pod structure 232a supporting a top port motor 232b. A rotor or propeller 234 may be driven by the top port motor 232b to provide thrust for the aerial vehicle 200. The top port motor pod 232 may be disposed on the first side 228 of the wing 220 and may be separated from the first end of the wing 220 by a spacer or winglet 238. The motor 232b applies a moment or torque on the propeller 234 to rotate it and in so doing applies an opposing moment or torque 236 on the aerial vehicle 200. The opposing moment 236 acts to rotate or urge the aerial vehicle 200 to rotate about its center of mass 202. The moment 236 may change in conjunction with the speed of the propeller 234 and as the propeller 234 is accelerated or decelerated. The propeller 234 may be a fixed or variable pitch propeller.

The angling of the axis of rotation of the motor 232b and propeller 234 from the vertical, but aligned with the plane of the winglet 238 and/or with a plane perpendicular to the wing plane 225, provides for a component of the thrust generated by the operation of the propeller 234 to be vertical, in the x-direction, and another component of the thrust to be perpendicular to the wing 220, in the negative z-direction. This perpendicular component of the thrust may act upon a moment arm along the wing 220 to the center of mass 202 of the aerial vehicle 200 to impart a moment to cause, or at least urge, the aerial vehicle 200 to rotate about its vertical axis when the aerial vehicle 200 is in vertical flight, and to roll about the horizontal axis when the aircraft is in forward horizontal flight. In some embodiments, this component of thrust perpendicular to the wing 220, or the negative z-direction, may also be applied in a position at the propeller 234 that is displaced a distance from the center of mass 202 of the aircraft 200, such as to apply a moment to the aerial vehicle 200 to cause, or at least urge, the aerial vehicle 200 to pitch about its center of mass 202. This pitching may cause, or at least facilitate, the transition of aerial vehicle 200 from vertical flight to horizontal flight, and from horizontal flight to vertical flight.

A bottom port motor pod 233 may include a bottom port pod structure 233a supporting a bottom port motor 233b. The bottom port motor 233b is disposed on the second side 226 of the wing 220 opposing the top port motor 232b. A rotor or propeller 235 may be driven by the bottom port motor 233b to provide thrust for the aerial vehicle 200. The bottom port motor pod 233 may be disposed on the second side 226 of the wing 220 and may be separated from the first end of the wing 220 by a spacer or winglet 239.

The motor 233b applies a moment or torque on the propeller 235 to rotate it and in so doing applies an opposing moment or torque 237 on the aerial vehicle 200. The opposing moment 237 acts to rotate or urge the aerial vehicle 200 to rotate about its center of mass 202. The moment 237 may change in conjunction with the speed of the propeller 235 and as the propeller 235 is accelerated or decelerated. The propeller 235 may be a fixed or variable pitch propeller.

The motor pod 233, the motor 233b, and the propeller 235 may all be aligned to be angled down in the direction of the second side 226 of the wing 220, down from the x-y plane in the z-direction, from the vertical while being within a plane of the winglet 239, such that any force, and force components thereof, generated by the propeller 235 shall align, and/or be within, the plane of the winglet 239, such that lateral forces to the plane of the winglet 239 are minimized or not generated. The alignment of the motor 233b and the propeller 235 may be a co-axial alignment of their respective axes of rotation.

The angle that the motor 233b and propeller 235 axes are from the vertical, x-direction may vary from 5 to 35 degrees. In one embodiment, the angle may be about 10 degrees from vertical. The angle of the motor 233b and propeller 235 axes may be determined by the desired lateral force component needed to provide sufficient yaw in vertical flight and/or sufficient roll in horizontal flight, such as that necessary to overcome wind effects on the wing 220. This angle may be minimized to maximize the vertical thrust component for vertical flight and the forward thrust component for horizontal flight.

The angling of the axis of rotation of the motor 233b and propeller 235 from the vertical, but aligned with the plane of the winglet 239 and/or with the plane perpendicular to the wing plane 225, provides for a component of the thrust generated by the operation of the propeller 235 to be vertical, in the x-direction, and another component of the thrust to be perpendicular to the wing 220, in the z-direction. This perpendicular component of the thrust may act upon a moment arm along the wing 220 to the center of mass 202 of the aerial vehicle 200 to impart a moment to cause, or at least urge, the aerial vehicle 200 to rotate about its vertical axis when the aerial vehicle 200 is in vertical flight, and to roll about the horizontal axis when the aircraft is in forward horizontal flight. In some embodiments, this component of thrust perpendicular to the wing 220, or the z-direction, may also be applied in a position at the propeller 235 that is displaced a distance from the center of mass 202 of the aircraft 200, such as to apply a moment to the aerial vehicle 200 to cause, or at least urge, the aerial vehicle 200 to pitch about its center of mass 202. This pitching may cause, or at least facilitate, the transition of aerial vehicle 200 from vertical flight to horizontal flight, and from horizontal flight to vertical flight.

A second motor assembly 240 is disposed at a second end or tip of the wing 220 distal from the fuselage 210 and distal from the first motor assembly 230. The second motor assembly 240 includes a pair of motor pods 242, 243 including pod structures 242a, 243a and motors 242b, 243b; winglets 248, 249; and propellers 244, 245. A top starboard motor pod 243 may include a top starboard pod structure 243a supporting a top starboard motor 243b. A rotor or propeller 245 may be driven by the top starboard motor 243b to provide thrust for the aerial vehicle 200. The top starboard motor pod 243 may be disposed on the first side 228 of the wing 220 and may be separated from the second end of the wing 220 by a spacer or winglet 249. The motor 243b applies a moment or torque on the propeller 245 to rotate it and in so doing applies an opposing moment or torque 247 on the aerial vehicle 200. The opposing moment 247 acts to rotate or urge the aerial vehicle 200 to rotate about its center of mass 202. The moment 247 may change in conjunction with the speed of the propeller 245 and as the propeller 245 is accelerated or decelerated. The propeller 245 may be a fixed or variable pitch propeller.

The motor pod 243, the motor 243b, and the propeller 245 may all be aligned to be angled up in the direction of the first side 228 of the wing 220, up from the x-y plane in the negative z-direction, from the vertical while being within a plane of the winglet 249, such that any force, and force components thereof, generated by the propeller 247 shall align, and/or be within, the plane of the winglet 249, such that lateral forces to the plane of the winglet 249 are minimized or not generated. The alignment of the motor 243b and the propeller 245 may be a co-axial alignment of their respective axes of rotation.

The angle that the motor 243b and propeller 245 axes are from the vertical, x-direction may vary from 5 to 35 degrees. In one embodiment, the angle may be about 10 degrees from vertical. The angle of the motor 243b and propeller 245 axes may be determined by the desired lateral force component needed to provide sufficient yaw in vertical flight and/or sufficient roll in horizontal flight, such as that necessary to overcome wind effects on the wing 220. This angle may be minimized to maximize the vertical thrust component for vertical flight and the forward thrust component for horizontal flight.

The angling of the axis of rotation of the motor 243b and propeller 245 from the vertical, but aligned with the plane of the winglet 249 and/or with the plane perpendicular to the wing plane 225, provides for a component of the thrust generated by the operation of the propeller 245 to be vertical, in the x-direction, and another component of the thrust to be perpendicular to the wing 220, in the negative z-direction. This perpendicular component of the thrust may act upon a moment arm along the wing 220 to the center of mass 202 of the aerial vehicle 200 to impart a moment to cause, or at least urge, the aerial vehicle 200 to rotate about its vertical axis when the aerial vehicle 200 is in vertical flight, and to roll about the horizontal axis when the aircraft is in forward horizontal flight. In some embodiments, this component of thrust perpendicular to the wing 220, or the negative z-direction, may also be applied in a position at the propeller 245 that is displaced a distance from the center of mass 202 of the aircraft 200, such as to apply a moment to the aerial vehicle 200 to cause, or at least urge, the aerial vehicle 200 to pitch about its center of mass 202. This pitching may cause, or at least facilitate, the transition of aerial vehicle 200 from vertical flight to horizontal flight, and from horizontal flight to vertical flight.

A bottom starboard motor pod 242 may include a bottom starboard pod structure 242a supporting a bottom starboard motor 242b. The bottom starboard motor 242b is disposed on the second side 226 of the wing 220 opposing the top starboard motor 243b. A rotor or propeller 244 may be driven by the bottom starboard motor 242b to provide thrust for the aerial vehicle 200. The bottom starboard motor pod 242 may be disposed on the second side 226 of the wing 220 and may be separated from the second end of the wing 220 by a spacer or winglet 248.

The motor pod 242, the motor 242b, and the propeller 244 may all be aligned to be angled down in the direction of the second side 226 of the wing 220, down from the x-y plane in the z-direction, from the vertical while being within a plane of the winglet 248, such that any force, and force components thereof, generated by the propeller 244 shall align, and/or be within, the plane of the winglet 248, such that lateral forces to the plane of the winglet 248 are minimized or not generated. The alignment of the motor 242b and the propeller 244 may be a co-axial alignment of their respective axes of rotation.

The angle that the motor 242b and propeller 244 axes are from the vertical, x-direction may vary from 5 to 35 degrees. In one embodiment, the angle may be about 10 degrees from vertical. The angle of the motor 242b and propeller 244 axes may be determined by the desired lateral force component needed to provide sufficient yaw in vertical flight and/or sufficient roll in horizontal flight, such as that necessary to overcome wind effects on the wing 220. This angle may be minimized to maximize the vertical thrust component for vertical flight and the forward thrust component for horizontal flight.

The motor 242b applies a moment or torque on the propeller 244 to rotate it and in so doing applies an opposing moment or torque 246 on the aerial vehicle 200. The opposing moment 246 acts to rotate or urge the aerial vehicle 200 to rotate about its center of mass 202. The moment 246 may change in conjunction with the speed of the propeller 244 and as the propeller 244 is accelerated or decelerated. The propeller 244 may be a fixed or variable pitch propeller.

The angling of the axis of rotation of the motor 242b and propeller 244 from the vertical, but aligned with the plane of the winglet 248 and/or with the plane perpendicular to the wing plane 225, provides for a component of the thrust generated by the operation of the propeller 244 to be vertical, in the x-direction, and another component of the thrust to be perpendicular to the wing 220, in the z-direction. This perpendicular component of the thrust may act upon a moment arm along the wing 220 to the center of mass 202 of the aerial vehicle 200 to impart a moment to cause, or at least urge, the aerial vehicle 200 to rotate about its vertical axis when the aerial vehicle 200 is in vertical flight, and to roll about the horizontal axis when the aircraft is in forward horizontal flight. In some embodiments, this component of thrust perpendicular to the wing 220, or the z-direction, may also be applied in a position at the propeller 244 that is displaced a distance from the center of mass 202 of the aircraft 200, such as to apply a moment to the aerial vehicle 200 to cause, or at least urge, the aerial vehicle 200 to pitch about its center of mass 202. This pitching may cause, or at least facilitate, the transition of aerial vehicle 200 from vertical flight to horizontal flight, and from horizontal flight to vertical flight.

The motors 232*b*, 233*b*, 242*b*, 243*b* operate such that variations in the thrust or rotation for fixed pitched rotors, and resulting torque or moment of pairs of the motors can create a resulting moment applied to the aerial vehicle 200 to move it in a controlled manner. Because of the angling off of the aircraft longitudinal centerline, vertical in hover and horizontal in forward horizontal flight, of each of the motors 232*b*, 233*b*, 242*b*, 243*b*, in addition to the moment imparted by the differential of the operation of the motors 232*b*, 233*b*, 242*b*, 243*b* a complementary force component is generated and applied to the aerial vehicle 200 to move it in the same manner.

Increasing thrust to the top two motors 232*b*, 243*b*, and decreasing thrust to the bottom two motors 233*b*, 242*b* in horizontal flight will cause the aerial vehicle 200 to pitch down. Decreasing thrust to the top two motors 232*b*, 243*b*, and increasing thrust to bottom two motors 233*b*, 242*b* in horizontal flight will cause the aerial vehicle 200 to pitch up. A differential between the thrust of the top two motors 232*b*, 243*b* and the bottom two motors 233*b*, 242*b* may be used to control the pitch of the aerial vehicle 200 during horizontal flight. In some embodiments, control surfaces 222, 224 on the wing 220 may also be used to supplement pitch control of the aerial vehicle 200. The separation of the top and bottom motors by their respective winglets is needed to create the pitch moment of the aerial vehicle 200.

Increasing thrust to the top port motor 232*b* and bottom starboard motor 242*b*, and decreasing thrust to the top starboard motor 243*b* and bottom port motor 233*b* in horizontal flight will cause the aerial vehicle 200 to roll clockwise relative to a rear view of the aerial vehicle 200. Decreasing thrust to top port motor 232*b* and bottom starboard motor 242*b*, and increasing thrust to the top starboard motor 243*b* and bottom port motor 233*b* in horizontal flight will cause the aerial vehicle 200 to roll counter-clockwise relative to a rear view of the aerial vehicle 200. A differential between the thrust of the top port and bottom starboard motors and the top starboard and bottom port motors may be used to control roll of the aerial vehicle 200 during horizontal flight. In some embodiments, control surfaces 222, 224 on the wing 220 may also be used to supplement roll control of the aerial vehicle 200.

Increasing thrust to both port motors 232*b*, 233*b* and decreasing thrust to both starboard motors 242*b*, 243*b* in horizontal flight will cause the aerial vehicle 200 to yaw towards starboard. Decreasing thrust to both port motors 232*b*, 233*b* and increasing thrust to both starboard motors 242*b*, 243*b* in horizontal flight will cause the aerial vehicle 200 to yaw towards port. A differential between the thrust of the top and bottom starboard motors 242*b*, 243*b* and the top and bottom port motors 232*b*, 233*b* may be used to control yaw of the aerial vehicle 200 during horizontal flight.

Figure 3:
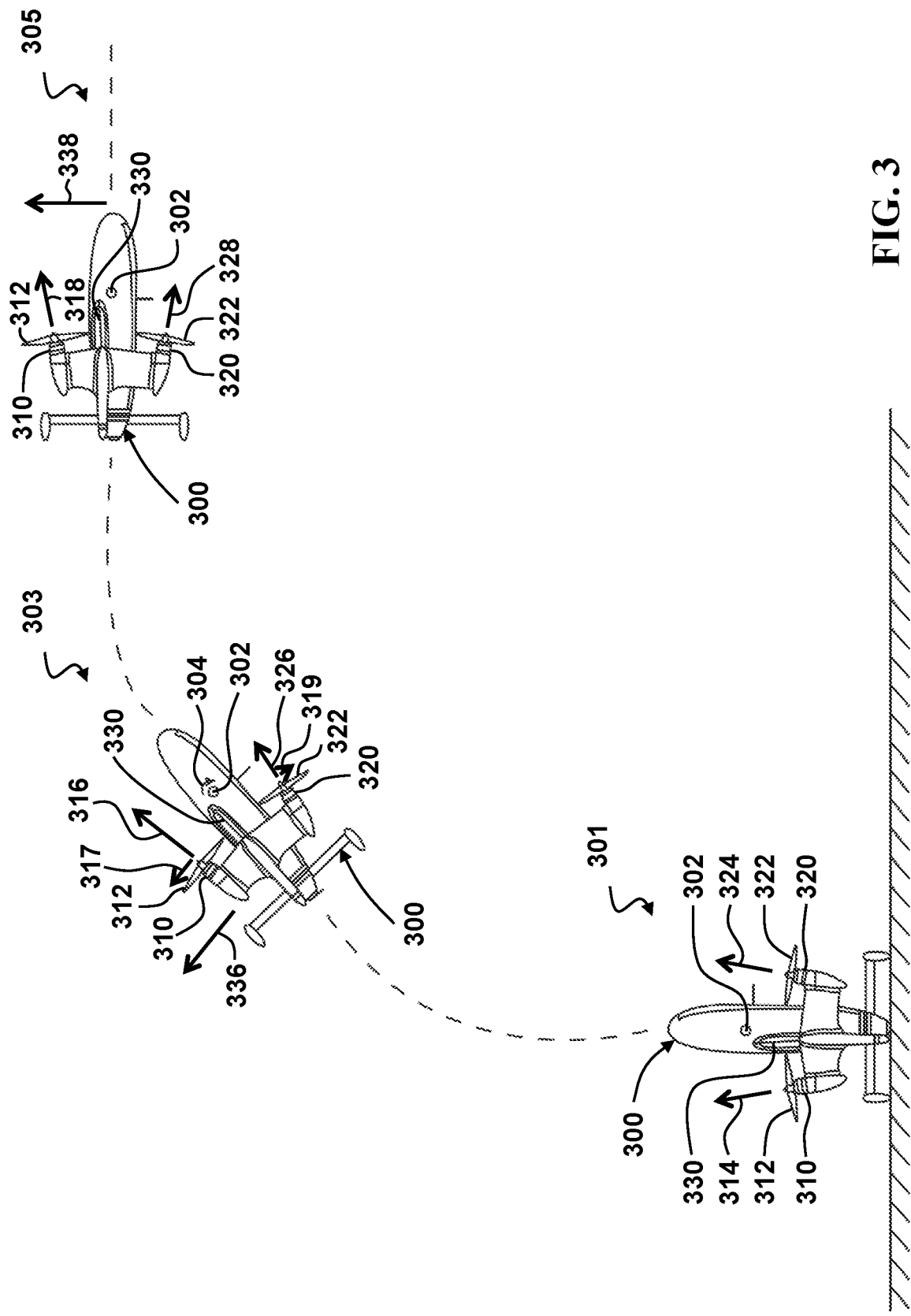
FIG. 3 depicts a VTOL aerial vehicle transitioning from vertical flight to horizontal flight by varying the thrust produced by its motors, according to one embodiment.

FIG. 3 depicts a VTOL aerial vehicle 300 transitioning from vertical flight to horizontal flight by varying the thrust produced by its motors, according to one embodiment. The aerial vehicle 300 is in a first position 301 on the ground ready for vertical take-off. A top motor 310 connected to a top propeller 312 is angled outward from vertical and away from a wing 330. A bottom motor 320 connected to a bottom propeller 322 is angled outward from vertical and away from the wing 330. The top motor 310 and bottom motor 320 are positioned at an end of the wing 330 of the aerial vehicle 300 and may be separated from the wing 330 by a winglet or spacer. Additional top and bottom motors and corresponding propellers may be present behind the top motor 310 and bottom motor 320 and positioned on the opposing end of the wing 330, such as shown in FIG. 2.

An on-board controller having a processor and addressable memory may send a signal to the motors to produce thrust needed for vertical take-off and subsequent adjustments to thrust during flight. Flight control may be anonymous, pre-programmed, and/or controlled by an external user at a ground control system. Top motors 310 create top thrust 314, and bottom motors create bottom thrust 324. During vertical take-off, the top thrust 314 and bottom thrust 324 may be substantially equal. The top thrust 314 and the bottom thrust 324 are depicted as angled based on the angles of the respective motors 310, 320 and propellers 312, 322 to have both a vertical and a lateral component.

The aerial vehicle 300 is in a second position 303 transitioning from vertical flight to horizontal flight. The aerial vehicle 300 pitches forward by increasing a top thrust 316 produced by the top motor 310 and decreasing a bottom thrust 326 produced by the bottom motor 320. This thrust differential produces a net moment 304 about a center of mass 302 of the aerial vehicle 300, which causes the aerial vehicle 300 to pitch forward. The component of the top thrust 316 in the lateral direction 317 is greater than the opposing lateral thrust 319 from the bottom thrust 326, and the lateral thrust 317 adds to the lift 336 created by the wing 330.

The aerial vehicle 300 is in a third position 305 in forward horizontal flight. The wing lift 338 is carrying the weight of the aerial vehicle 300. As the top thrust 318 and bottom thrust 328 are adjusted, the aerial vehicle 300 may be pitched up or down. Adjusting thrust to the motors on the opposing end of the wing 330 of the aerial vehicle 300 may allow the aerial vehicle 300 to be yawed left or right by differential thrust between the right and left sides.

In certain embodiments, there are separate controllers being utilized by the aerial vehicle 300 between the first position 301 and the third position 305. In many embodiments, the ailerons and differential motors of the aerial vehicle 300 are utilized in the third position 305. In further embodiments, the ailerons control the roll and pitch of the aerial vehicle 300 while the differential motors control the yaw of the aerial vehicle 300 in the third position 305. In additional embodiments, only the differential motors are utilized for control of the aerial vehicle 300 in the first position 301. In still additional embodiments, control of the aerial vehicle 300 is transitioned from a first set of controls in the first position 301 to a second set of controls in the third position 305 during the transition of the second position 303. In still further embodiments, the transition between controls of the first position 301 and the third position 305 is accomplished via a fading method. In still yet further embodiments, a series of health checks are performed during the second position 303 to evaluate the transition. By way of example, but not limitation, when the controls of the third position are not found or fail, the transition may be cancelled and/or the controls from the first position 301 may be utilized.

In some embodiments, the aerial vehicle 300 may experience a dip in altitude between reaching an initial height for rotation, as shown in the second position 303, and horizontal flight, as shown in the third position 305. For example, with an initial height of forty meters, the aerial vehicle 300 may experience a drip of about five meters during the transition from vertical flight to horizontal flight. The horizontal speed may also change during the rotation process. Before rotating, the horizontal speed of the aerial vehicle 300 may be negligible, such as zero meters per second. Once rotation has completed, the aerial vehicle may be traveling at a horizontal speed of twenty meters per second. The aerial vehicle accelerates and gains speed in the horizontal direction during the rotation from vertical to horizontal so as to ensure that the aerial vehicle 300 maintains a horizontal flight speed above a stall speed once the rotation is complete.

Figure 4:
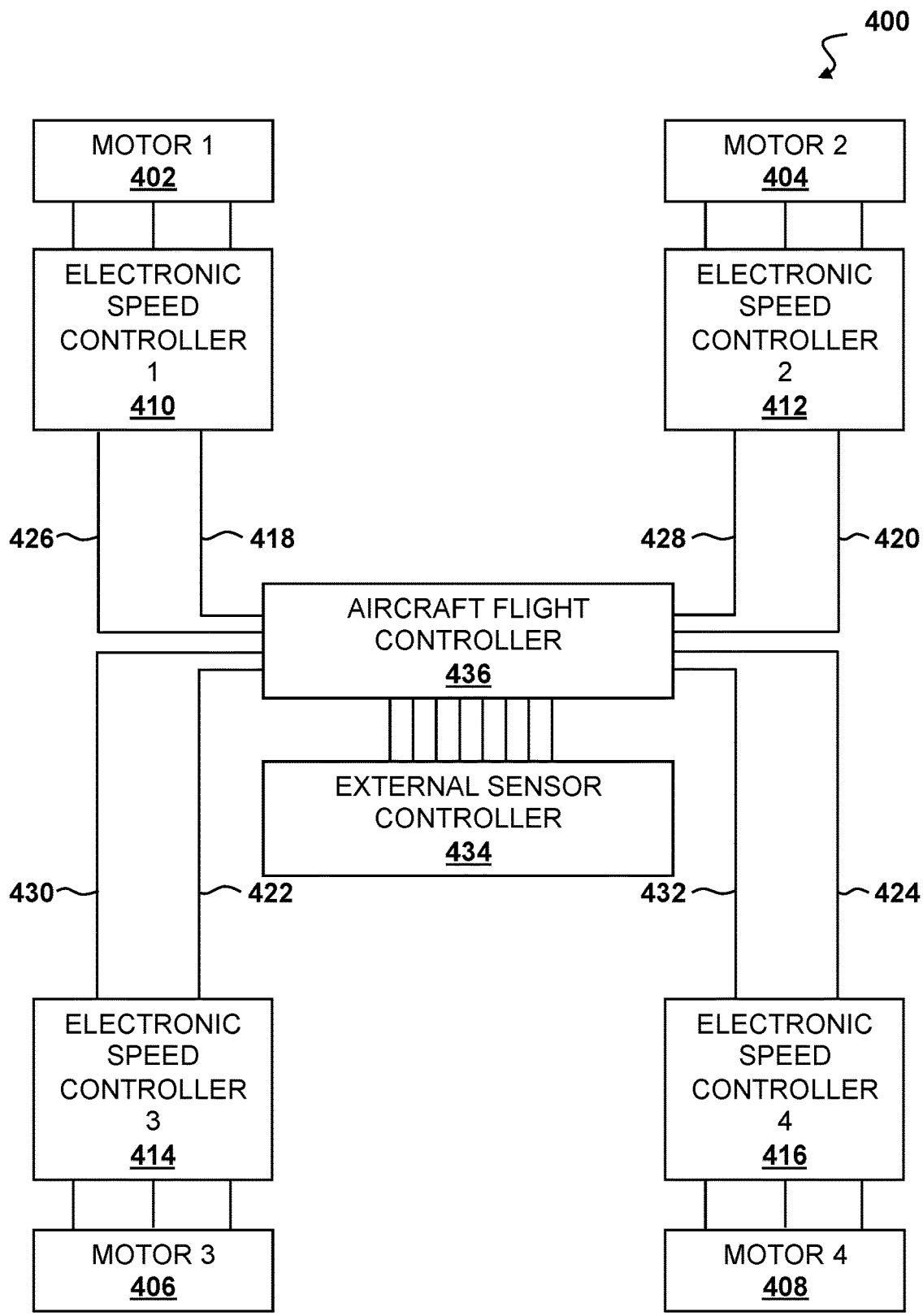
FIG. 4 depicts a system architecture of an aerial vehicle having an aircraft flight controller connected in between the external sensor controller and each electronic speed controller to effect energy efficient lift-off and landings, according to one embodiment.

FIG. 4 depicts a system architecture 400 of an aerial vehicle having an aircraft flight controller 436 connected in between the external sensor controller 434 and each electronic speed controller to effect energy efficient lift-off and landings, according to one embodiment. A quadcopter-style UAS may have four propulsion devices, e.g., motors (402, 404, 406, 408) which are each controlled by a corresponding electronic speed controller (410, 412, 414, 416). In a typical aerial vehicle, each electronic speed controller (410, 412, 414, 416) may have respective power connections (418, 420, 422, 424) and signal connections (426, 428, 430, 432). In certain embodiments, these connections (418, 420, 422, 424, 426, 428, 430, 432) may be wired into an external sensor controller 434 with a wiring harness.

An aerial vehicle may allow for the quick removal and replacement of any individual motor and/or electronic speed controller, and so typically utilize wiring harnesses for easy connections. Instead of being directly connected into the external sensor controller 434, these connections (418, 420, 422, 424, 426, 428, 430, 432) may be connected into an aircraft flight controller 436 or other control system. The aircraft flight controller 436 may then pass these connections through to the external sensor controller 434, and the external sensor controller 434 may continue to function as if it were directly connected. The aircraft flight controller 436 may determine the most energy-efficient location for transition from one flight mode into another. This transition may be accomplished through means including increasing, reducing, cutting, and/or reversing the throttle of one or more of the motors (402, 404, 406, 408) to facilitate an energy-efficient orientation change.

Figure 5:
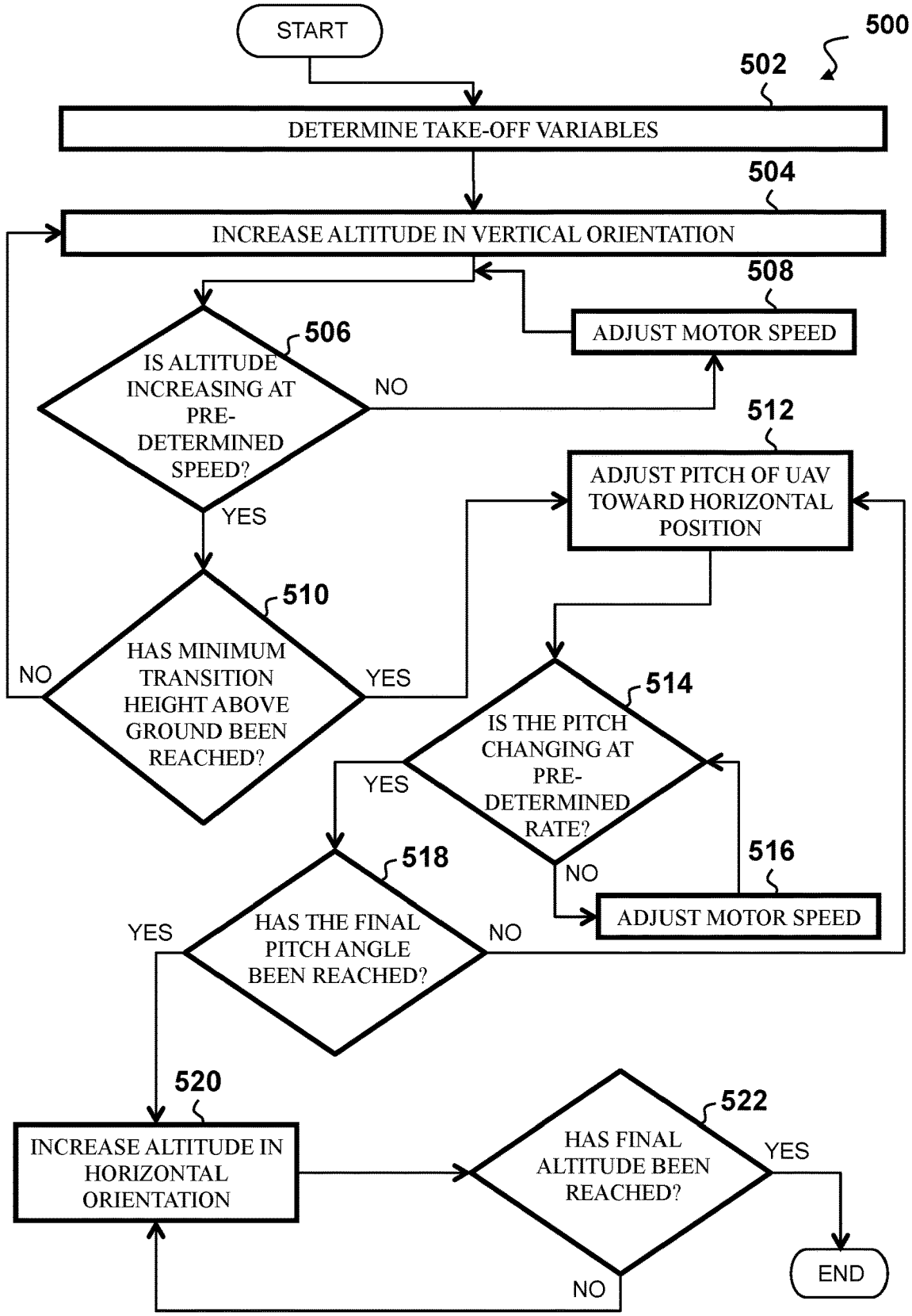
FIG. 5 depicts a process for energy-efficient take-offs for VTOL aerial vehicles, according to one embodiment.

FIG. 5 depicts a process for energy-efficient take-offs for VTOL aerial vehicles, according to one embodiment. The process 500 begins by determining (502) a set of variables including, but not limited to, a vertical ascent speed, a pitch adjustment rate, a final pitch angle, a horizontal ascent speed, a minimum transition height above ground, a final altitude, a minimum airspeed for horizontal flight, a wind speed, and/or a wind direction.

The vertical ascent speed is the speed at which the aerial vehicle ascends in the vertical orientation. The vertical ascent speed may be a maximum ascent speed for the aerial vehicle from launch on the ground. The pitch adjustment rate may be the rate at which the aerial vehicle can rotate from horizontal to vertical. The pitch adjustment rate may be based on the speed at which the aerial vehicle can rotate based on power applied to the one or more motors and/or movements of one or more effectors of the aerial vehicle. The pitch adjustment rate may also be based on the rate at which the aerial vehicle may increase speed in the horizontal direction. The horizontal speed of the aerial vehicle may be about zero meters per second prior to transition and may need to be about twenty meters per second after transition so as to be above a minimum stall speed. The pitch adjustment rate may need to ensure that the minimum stall speed in reached in horizontal flight prior to the end of the transition or the aerial vehicle may not maintain steady horizontal flight and may be at risk of dipping in altitude and/or impacting the ground. The final pitch angle may be the angle of the aerial vehicle in horizontal flight. In some embodiments, the final pitch angle may be about perpendicular to the vertical flight or hovering angle. In other embodiments, the final pitch angle may be an acute angle relative to the vertical flight or hovering angle, such as in embodiments where a nose of the aerial vehicle is elevated above a horizontal plane when the aerial vehicle is in horizontal flight.

The horizontal ascent speed may be the speed of the aerial vehicle in horizontal flight. The minimum transition height above ground may be a set altitude above the ground or mean sea level (MSL) at which the aerial vehicle begins the transition from vertical flight or hovering to horizontal flight. The minimum transition height may be based on safety considerations, aerial vehicle geometry, energy usage, rules and regulations, and the like. For example, the minimum transition height may be about forty meters above ground so as to provide a buffer in the event of a drip, such as a five-meter dip, during transition from vertical to horizontal flight. The final altitude may be a final altitude of the aerial vehicle for one or more missions to be performed by the aerial vehicle. For example, the minimum transition height may be forty meters for a final altitude of one hundred and twenty meters. The aerial vehicle may gain additional height in horizontal flight after transitioning to horizontal flight as this elevation gain may be more efficient in horizontal flight than in vertical flight.

The minimum airspeed for horizontal flight may be the airspeed of the aerial vehicle in horizontal flight above stall speed. If the speed of the aerial vehicle drops below the stall speed the aerial vehicle may stall and/or begin to lose altitude. The wind speed may be a speed of wind. The wind direction may be a direction of the wind. The wing of the aerial vehicle may act as a sail and so orientation of the wing may allow for an increased and/or decreased pitch adjustment rate. The wind direction and speed may also effect the position of the aerial vehicle and may be used to orient the aerial vehicle such that the aerial vehicle moves towards a desired target, such as a field to be imaged, and/or away from an undesired target, such as above a restricted flying area, telephone poles, or other hazards or potential hazards.

In many embodiments, these variables are pre-determined by the application and/or requested by a user. In certain embodiments, the user may enter these variables into the ground control system. In a number of embodiments, these variables may be determined at run time based on feedback gained from the aerial vehicle's internal sensors. In various embodiments, only a partial set of variables may be determined at this stage of the process.

The aerial vehicle can increase (504) altitude in the vertical orientation. At least once, during this increase (504), the aerial vehicle may check to determine if the altitude is increasing at the pre-determined speed (506). When the altitude is not increasing at the predetermined rate (506), then the motor speed can be adjusted (508) in order to affect the correct ascent speed. In a variety of embodiments, this adjustment may occur multiple times per second. When the altitude is increasing at a proper rate, the aerial vehicle can determine if a minimum height above ground has been reached (510). When the minimum height above ground has not been reached, the aerial vehicle can continue to increase (504) altitude. In some embodiments, the minimum height above ground is forty meters from the ground. Once the minimum height above ground is reached (510), the unmanned aerial vehicle (UAV) can adjust (512) its pitch toward the horizontal position. During this adjustment (512), the UAV may calculate the change in pitch to evaluate if the change is occurring at a pre-determined rate (514). When the rate of pitch change is not at the pre-determined rate, the motor speeds may be adjusted (516). In some embodiments, the rate of pitch change is optimized to minimize the loss in altitude during the pitch change process. When the pitch change is occurring at the proper rate (514), the aerial vehicle may check whether the final pitch anglepitch angle has been reached (518). If the final pitch anglepitch angle has not been reached (518), the aerial vehicle can continue to adjust (512) the pitch. Once the final pitch anglepitch angle has been reached (518), the aerial vehicle can increase (520) altitude. The aerial vehicle may check if the final horizontal orientation altitude has been reached (522). If proper altitude has not been reached (522), then the aerial vehicle continues to increase (520) altitude. When proper final horizontal orientation altitude is reached (522), then the energy-efficient take-off process ends. In still further embodiments, the vertical control system is utilized during step 500 through step 510 and the horizontal controls are utilized during steps 520 to 522. In still yet further embodiments, the controls are faded from the vertical control system to the horizontal control system between step 512 and 518.

Figure 6:
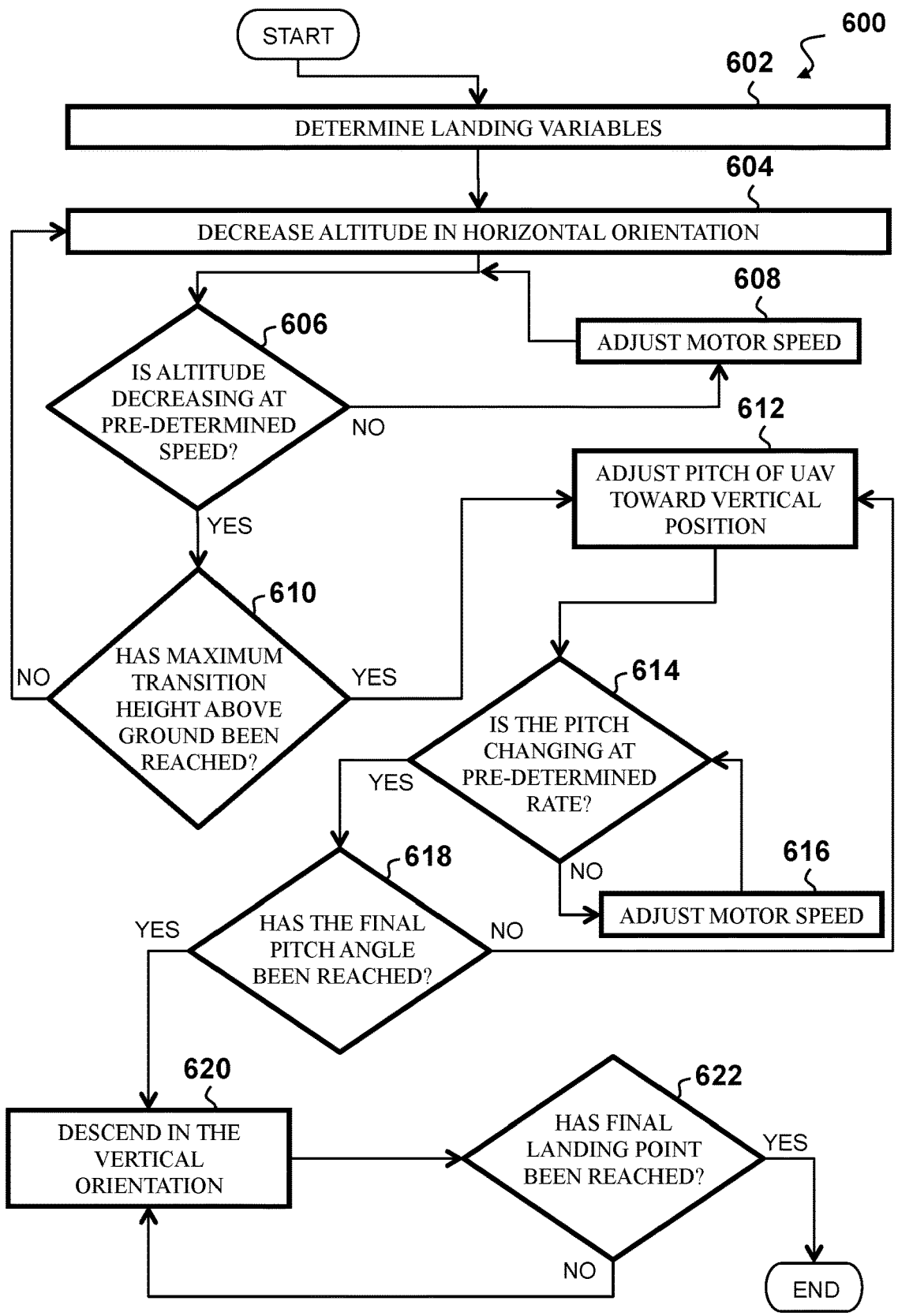
FIG. 6 depicts a process for energy-efficient landings for VTOL aerial vehicles, according to one embodiment.

FIG. 6 depicts a process for energy-efficient landings for VTOL aerial vehicles, according to one embodiment. The process 600 begins by determining (602) a set of variables including, but not limited to, vertical descent speed, pitch adjustment rate, final pitch angle, horizontal descent speed, maximum transition height above ground, landing point, wind speed, and/or wind direction.

The vertical descent speed is the speed at which the aerial vehicle descends in the vertical orientation. The vertical descent speed may be a maximum descent speed for the aerial vehicle from transition to landing on the ground. The pitch adjustment rate may be the rate at which the aerial vehicle can rotate from vertical to horizontal. The pitch adjustment rate may be based on the speed at which the aerial vehicle can rotate based on power applied to the one or more motors and/or movements of one or more effectors of the aerial vehicle. The pitch adjustment rate may also be based on the rate at which the aerial vehicle may decrease speed in the horizontal direction. The horizontal speed of the aerial vehicle may be about zero meters per second after transition and may be as high as about twenty meters per second prior to transition so as to be above a minimum stall speed. The pitch adjustment rate may need to ensure that horizontal speed is at or close to zero at the end of the transition or the aerial vehicle may continue to move away from a desired landing location. The final pitch angle may be the angle of the aerial vehicle in vertical flight. In some embodiments, the final pitch angle may be about perpendicular to the horizontal flight. In other embodiments, the final pitch angle may be an acute angle relative to the horizontal flight, such as in embodiments where a nose of the aerial vehicle is offset from a vertical plane when the aerial vehicle is hovering and/or in vertical flight.

The horizontal descent speed may be the speed of the aerial vehicle in horizontal flight. The maximum transition height above ground may be a set altitude above the ground or mean sea level (MSL) at which the aerial vehicle begins the transition from horizontal flight to hovering or vertical flight. The maximum transition height may be based on safety considerations, aerial vehicle geometry, energy usage, rules and regulations, and the like.

The landing point may be the landing location of the aerial vehicle. In some embodiments, the landing point may be the same as, or close to, the take-off location. In other embodiments, the landing point may be disposed distal from the take-off location. The wind speed may be a speed of wind. The wind direction may be a direction of the wind. The wing of the aerial vehicle may act as a sail and so orientation of the wing may allow for an increased and/or decreased pitch adjustment rate. The wind direction and speed may also effect the position of the aerial vehicle and may be used to orient the aerial vehicle such that the aerial vehicle moves towards a desired target, such as a field to be imaged, and/or away from an undesired target, such as above a restricted flying area, telephone poles, or other hazards or potential hazards.

In many embodiments, these variables are pre-determined by the application and/or requested by the user. In certain embodiments, the user may enter these variables into the ground control system. In a number of embodiments, these variables may be determined at run time based on feedback gained from the aerial vehicle's internal sensors. In various embodiments, certain variables may not yet be determined at this stage of the process and are later determined.

The aerial vehicle can decrease (604) altitude in the horizontal orientation. At least once, during this decrease (604), the aerial vehicle may check to determine if the altitude is decreasing at the pre-determined speed (606). When the altitude is not decreasing at the predetermined rate (606), then the motor speed can be adjusted (608) in order to affect the correct descent speed. When the altitude is decreasing at a proper rate, the aerial vehicle can determine if a maximum height above ground has been reached (610). When the maximum height above ground has not been reached, the aerial vehicle can continue to decrease (604) altitude. In some embodiments, the maximum height above ground is forty meters from the ground. Once the maximum height above ground is reached (610), the unmanned aerial vehicle (UAV) can adjust (612) its pitch toward the vertical position. During this adjustment (612), the UAV may calculate the change in pitch to evaluate if the change is occurring at a pre-determined rate (614). When the rate of pitch change is not at the pre-determined rate, the motor speeds may be adjusted (616). When the pitch change is occurring at the proper rate (614), the aerial vehicle may check whether the final pitch angle has been reached (618). If the final pitch angle has not been reached (618), the aerial vehicle can continue to adjust (612) the pitch. The aerial vehicle may check if the final landing point has been reached (622). If the final landing point has not been reached (622), then the aerial vehicle continues to decrease (620) altitude. When the final landing point is reached (622), then the energy-efficient landing process ends. In certain embodiments, the process 600 may step through a series of steps upon transition from horizontal to vertical orientations (or attitudes), including stabilizing the attitude, obtaining a velocity hold at or near zero, and then beginning the descent (620) in the vertical orientation. In still further embodiments, the horizontal control system is utilized during step 600 through step 610 and the vertical controls are utilized during steps 620 to 622. In still yet further embodiments, the controls are faded from the horizontal control system to the vertical control system between step 612 and 618.

In a number of embodiments, the aerial vehicle utilizes the camera sensors to determine the minimum or maximum height above ground at which to transition between orientations. In certain embodiments, the minimum or maximum height above ground for transitions may be received from the user via manual input. The transition between orientations optimally occurs in areas where there are no barriers or other physical restraints to the aerial vehicle's movement and ascent/descent.

In a number of embodiments, the take-off process includes starting from a take-off location and commanding the UAV motors to zero speed. In many embodiments, the UAV motors are sped up to approximately 700-1,200 revolutions per minute (RPMs). In further embodiments, the UAV verifies that the motors have all reached the proper RPM levels before continuing in the transition process. In certain embodiments, the UAV also checks to verify that the current draw is also in an appropriate range. This starting process can be repeated multiple times if motors fail to reach the proper level in a pre-determined amount of time. In additional embodiments, if the UAV fails to reach the proper RPM, then the UAV will not take off. In certain additional embodiments, the proper RPM is approximately 1,000 RPM. The system may measure the current draw when the propellers are turning at a set speed, such as 1,000 RPM. If the current draw is within a set or appropriate range, then the UAV may continue with the take-off process. If the current draw is not within a set or appropriate range and/or the motors do not reach 1,000 RPM after a set number of attempts, such as three, the system may not take-off and an indication may be sent to a user or operator. Once a proper starting process has been completed, a climb-rate command can be initiated. In further embodiments, the UAV attempts to climb at a rate that is ramped up from 0 meters per second (m/s) to 4 m/s. In still further embodiments, the UAV determines the altitude and continues the climb-rate command until both proper climb rate speeds have been reached and the proper altitude has been achieved. In yet still further embodiments, if the velocity does not reach 4 m/s within a pre-determined time, the UAV will not take off and will initiate an immediate landing routine. In further additional embodiments, the pre-determined time is 8 seconds. If the UAV does not reach this pre-determined speed, then it is indicative of an error with the UAV, the controller, weather conditions, or the like and attempting to transition the UAV to horizontal flight may cause further issues or failure.

In many embodiments, when a proper climb-rate command has concluded, a climb and turn process can begin. In the climb and turn process, the UAV may continue to climb at a rate of 4 m/s. In additional embodiments, the UAV also calculates the initial direction of the first flight segment that it should traverse. The UAV may slowly begin to turn to face the initial flight segment direction when it has been determined. In numerous embodiments, when the UAV has maneuvered to the proper initial direction, it can begin to pitch over. The pitch over can command the UAV to adjust its pitch slightly below what it currently is. By way of example and not limitation, a pitch command may command the UAV to pitch forward 5 degrees at a time. In some embodiments, the five degree pitch forward may be a constant command. For example, the processor may provide a command to check the current orientation and add five degrees to that orientation each time such that the command is continuous during transition if no errors occur instead of adding five degrees, waiting for the five degrees to be reached, calculating another five degrees, etc. In an embodiment with a 50 Hz refresh rate, the system may perform this process fifty times a second. In certain embodiments, the pitching down of the nose is accomplished while maintaining a climb rate similar to the climb rate of the UAV prior to the pitch over command. In still additional embodiments, when the UAV reaches a pitch of −45 degrees, the UAV will switch controllers over to the airplane pitch over process. In yet additional embodiments, if the pitch over commands take more than a pre-determined time to pitch over −45 degrees, then the UAV will attempt to land immediately. In yet still additional embodiments, the pre-determined time for pitch over may be 2.5 to 9 seconds.

During this transition of controllers, the UAV may go from using full propellers in hover mode to no propellers in flight mode. Additionally, the UAV can transition from not utilizing the elevons to fully utilizing the elevons. In a variety of embodiments, this transition between propellers and elevons may occur in approximately 1 second. In further embodiments, the UAV will continue pitching down in airplane mode after it switches from hover mode at the −45 degree mark until the UAV is approximately −90 degrees or greater. In still further embodiments, if there is stabilizing portion of where there's attitude and a need to roll pitch or adjust airspeed, the UAV may attempt to verify that it is travelling above a minimum required safe airspeed. In a number of embodiments, once the UAV has verified that is has been travelling at or more than the minimum airspeed for at least 3 seconds, and/or the UAV has been stabilized for at least 6 seconds, then the UAV has completed the transition from hover mode to airplane mode.

In a variety of embodiments, the UAV can begin the transition from airplane mode to hover mode by determining where the transition should occur. Wind speeds can affect potential transition durations. For example, attempting to complete a transition while flying into a headwind will allow for a shorter transition time. Flying into a headwind and pitching up may cause the pitching up to occur at a faster rate as the headwind pushes against the wing of the UAV and encourages it to rotate. Conversely, flying into a tailwind can lead to a longer transition time. The difference in transition time between no wind and flying into a headwind or tailwind may be about one second to two seconds. Therefore, in many embodiments, it is desirable to transition the UAV from airplane mode to hover mode as close to the landing site as possible to avoid a prolonged, and less energy-efficient hover mode operation time. In numerous embodiments, once the position for the transition has been calculated, the UAV waits until it has reached that point before beginning the transition. In additional embodiments, during the transition, the UAV may do a cross-check control, meaning that the UAV transitions from attempting to stay on the current flight segment, to attempting to hold a zero turn rate during the transition. When transitioning to hover or vertical flight from horizontal flight, the UAV may initially attempt to maintain a path of travel. In some embodiments, once the transition begins the UAV may prioritize completing the transition than maintaining the path of travel, or attempting a zero turn rate. In still additional embodiments, the climb-rate of the UAV is reduced to approximately 2 m/s, and attempts to maintain a level flight condition. In still yet additional embodiments, the UAV can continue this transition for at most 2-6 seconds at close to zero velocity conditions, to at most 5-8 seconds if the velocity conditions have not yet been met. In more embodiments, the UAV continues this transition for at most 3 seconds at close to zero velocity conditions, and at most 6 seconds if the velocity conditions have not yet been met. When this has been successfully completed, then a pitch up command can be sent.

In many embodiments, the pitch up command attempts to tip up the UAV slightly more than it currently is. In certain embodiments, the pitch-up command can be 5-12 degrees higher than the UAV was during the previous command. In further embodiments, the pitch up commands are sent until the pitch of the UAV has exceeded 40 degrees, or at least 3 seconds have elapsed. In still further commands, the mix between use of the elevons and the propellers changes until there is zero elevon use and increased propeller usage. In yet further embodiments, the transition from airplane mode controls to hover mode controls occurs when the UAV pitch is approximately within 10 degrees of the 90 degree upright pitch. In certain further embodiments, the pitch up commands may also cease when at least 3 seconds have elapsed. When this occurs, additional embodiments of the invention transitions the UAV holding attitude, setting all pitch commands down to zero while the roll command is also at zero. In further additional embodiments, the UAV will attempt to have a 0 m/s climb rate and be stabilized at this point. In yet additional embodiments, this continues until the UAV has been in that position for at least three seconds and/or the ground velocity is less than 3 m/s. In a number of embodiments, once these conditions are met, the UAV has transition from airplane mode to hover mode and the landing process can begin.

Figure 7:
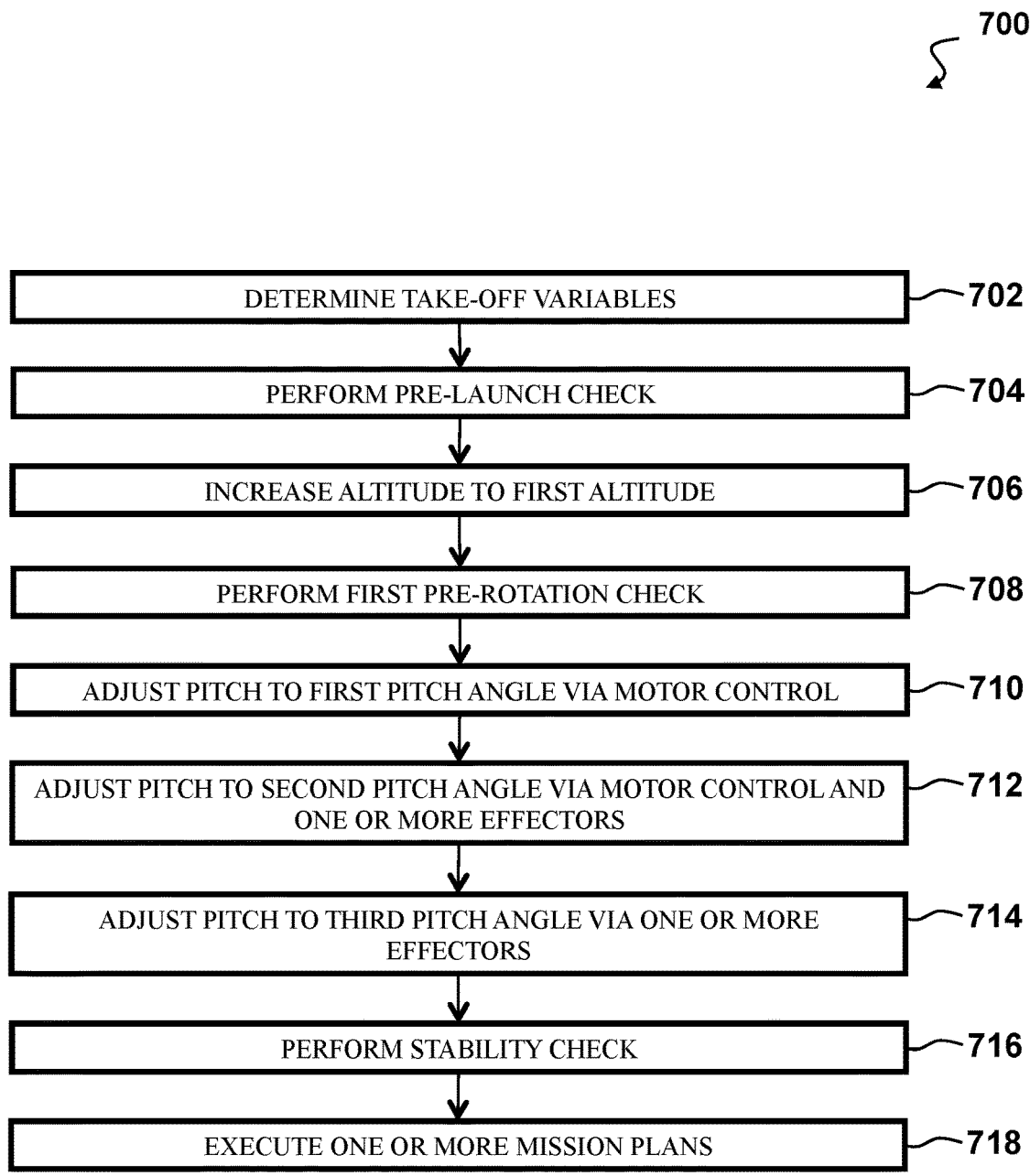
FIG. 7 depicts a flowchart of a method for take-off and transition from vertical to horizontal flight for a VTOL aerial vehicle, according to one embodiment.

FIG. 7 depicts a flowchart of a method 700 for take-off and transition from vertical to horizontal flight for a VTOL aerial vehicle, according to one embodiment. The method 700 may include determining take-off variable (step 702). The take-off variables may be set by a user or operator and/or calculated by a processor of the system based on the aerial vehicle characteristics. In many embodiments, these variables are pre-determined by the application and/or requested by a user. In certain embodiments, the user may enter these variables into the ground control system. In a number of embodiments, these variables may be determined at run time based on feedback gained from the aerial vehicle's internal sensors. In various embodiments, only a partial set of variables may be determined at this stage of the process. The take-off variables may include, but are not limited to, a vertical ascent speed, a pitch adjustment rate, a final pitch angle, a horizontal ascent speed, a minimum transition height above ground, a final altitude, a minimum airspeed for horizontal flight, a wind speed, and/or a wind direction.

The vertical ascent speed is the speed at which the aerial vehicle ascends in the vertical orientation. The vertical ascent speed may be a maximum ascent speed for the aerial vehicle from launch on the ground. The pitch adjustment rate may be the rate at which the aerial vehicle can rotate from horizontal to vertical. The pitch adjustment rate may be based on the speed at which the aerial vehicle can rotate based on power applied to the one or more motors and/or movements of one or more effectors of the aerial vehicle. The pitch adjustment rate may also be based on the rate at which the aerial vehicle may increase speed in the horizontal direction. The horizontal speed of the aerial vehicle may be about zero meters per second prior to transition and may need to be about twenty meters per second after transition so as to be above a minimum stall speed. The pitch adjustment rate may need to ensure that the minimum stall speed in reached in horizontal flight prior to the end of the transition or the aerial vehicle may not maintain steady horizontal flight and may be at risk of dipping in altitude and/or impacting the ground. The final pitch angle may be the angle of the aerial vehicle in horizontal flight. In some embodiments, the final pitch angle may be about perpendicular to the vertical flight or hovering angle. In other embodiments, the final pitch angle may be an acute angle relative to the vertical flight or hovering angle, such as in embodiments where a nose of the aerial vehicle is elevated above a horizontal plane when the aerial vehicle is in horizontal flight.

The horizontal ascent speed may be the speed of the aerial vehicle in horizontal flight. The minimum transition height above ground may be a set altitude above the ground or mean sea level (MSL) at which the aerial vehicle begins the transition from vertical flight or hovering to horizontal flight. The minimum transition height may be based on safety considerations, aerial vehicle geometry, energy usage, rules and regulations, and the like. For example, the minimum transition height may be about forty meters above ground so as to provide a buffer in the event of a drip, such as a five-meter dip, during transition from vertical to horizontal flight. The final altitude may be a final altitude of the aerial vehicle for one or more missions to be performed by the aerial vehicle. For example, the minimum transition height may be forty meters for a final altitude of one hundred and twenty meters. The aerial vehicle may gain additional height in horizontal flight after transitioning to horizontal flight as this elevation gain may be more efficient in horizontal flight than in vertical flight.

The minimum airspeed for horizontal flight may be the airspeed of the aerial vehicle in horizontal flight above stall speed. If the speed of the aerial vehicle drops below the stall speed the aerial vehicle may stall and/or begin to lose altitude. The wind speed may be a speed of wind. The wind direction may be a direction of the wind. The wing of the aerial vehicle may act as a sail and so orientation of the wing may allow for an increased and/or decreased pitch adjustment rate. The wind direction and speed may also influence the position of the aerial vehicle and may be used to orient the aerial vehicle such that the aerial vehicle moves towards a desired target, such as a field to be imaged, and/or away from an undesired target, such as above a restricted flying area, telephone poles, or other hazards or potential hazards.

The method 700 may then include performing a pre-launch check (step 704). The pre-launch check may ensure that all necessary components are working prior to launch of the aerial vehicle. By performing a pre-launch check any issues or errors may be noted, such as via an indication sent to a ground control station. The pre-launch check may involve sting each motor speed to a set rotation amount and/or checking the current draw on the battery. In one embodiment, the system may spin the motors up to 1,000 RPM and check the current draw against a set range. If the motors do not reach the desired speed in the set amount of time and/or if the current draw is outside a range, then the system may attempt the pre-launch check again. After a set number of fails, such as three, the system may abort launch procedures and/or send a notification to a ground control statement. The notification may contain any errors and/or possible fixes. For example, if one of four motors is not reaching 1,000 RPM a notification may indicate the motor and suggest a possible resolution, such as checking the motor, checking the propeller, replacing the motor, or the like.

If the pre-launch check is successful, the method 700 may then include increasing altitude to a first altitude (step 706). The first altitude may be a height at which the aerial vehicle can begin a transition from vertical flight and/or hovering to horizontal flight. The first altitude may be less than an altitude desired and/or needed to execute one or more mission plans. For example, the first altitude may be forty meters above ground and the mission plan may be to image a field at one hundred and twenty meters. Due to horizontal flight being more efficient than vertical flight or hover, the first altitude may be set as a safe distance above the ground to allow the aerial vehicle to transition to horizontal flight. During the transition from vertical to horizontal flight the aerial vehicle may lose altitude, such as five meters of altitude. The first altitude may ensure that any loss in altitude still places the aerial vehicle at a sufficient altitude above the ground, any obstacles, power lines, vegetation, or the like.

The method 700 may then perform a first pre-rotation check (stop 708). As with the pre-flight check, the pre-rotation check may be used to verify the operating condition of the aerial vehicle motors, battery, control surfaces, or the like. If a set speed or RPM is not reached, the processor may determine that an error has occurred and the processor may terminate the transition. If the transition is terminated, the aerial vehicle may not leave vertical flight and may proceed with landing in vertical flight. In some embodiments, the pre-rotation check may not be used.

Once the pre-flight check has passed, the method 700 may include adjusting pitch to a first pitch angle via a motor control (step 710). The processor may command the one or more motors to adjust their thrust in order to cause a rotation of the aerial vehicle. For example, in the aerial vehicle shown in FIG. 2, the processor may send one or more commands to pitch the aerial vehicle pitches forward toward the first pitch angle by increasing a top thrust produced by the top motors and decreasing a bottom thrust produced by the bottom motors. In some embodiments, the use of control surfaces may be ineffective at rotating the aerial vehicle from vertical flight to the first pitch angle.

Once the first pitch angle is reached, the method 700 may include adjusting pitch to a second pitch angle via motor control and/or one or more effectors (step 712). From the first pitch angle to the second pitch angle, the processor may use a blend of controlling thrust to the one or more motors and controlling movement of one or more effectors, such as ailerons, elevons, or the like.

Once the second pitch angle is reached, the method 700 may include adjusting pitch to a third pitch angle via the one or more effectors (step 714). From the second pitch angle to the third pitch angle, the processor may use controls to one or more effectors to control rotation of the aerial vehicle. The use of effectors may provide greater control when the vehicle is almost in horizontal flight. The use of effectors may also allow for more thrust to be produced by the motors of the aerial vehicle so that the aerial vehicle may reach the minimum airspeed for horizontal flight above the stall speed so that the aerial vehicle can maintain horizontal flight once the transition from vertical to horizontal flight is complete. In some embodiments, only motor control may be used to rotate the aerial vehicle. In some embodiments, the amount of blending and/or use of blending of the motor control and effector control may depend on the aerial vehicle characteristics. In one embodiment, the first pitch angle may be about thirty degrees from vertical, the second pitch angle may be about sixty degrees from vertical, and the third pitch angle may be about ninety degrees from vertical. The third pitch angle may substantially correspond to horizontal flight.

Once the third pitch angle has been reached, the method 700 may include the processor performing a stability check (step 716). Prior to executing any mission plans, the processor checks to ensure that the aerial vehicle is stable. If there is any instability, the processor may attempt to stabilize the aerial vehicle, transition back to vertical flight, and/or perform a landing. The processor ensures that the aerial vehicle is stable prior to performing any turns or maneuvers that may cause further instability, exacerbate an error, or the like.

Once the vehicle is stable, the method 700 may include the processor commanding the aerial vehicle to execute one or more mission plans (step 718). The one or more mission plans may involve increasing elevation, imaging one or more fields, and the like. The aerial vehicle may increase elevation in horizontal flight, which is more energy-efficient than vertical flight, after the stability check up to a final elevation for execution of the one or more mission plans.

Figure 8:
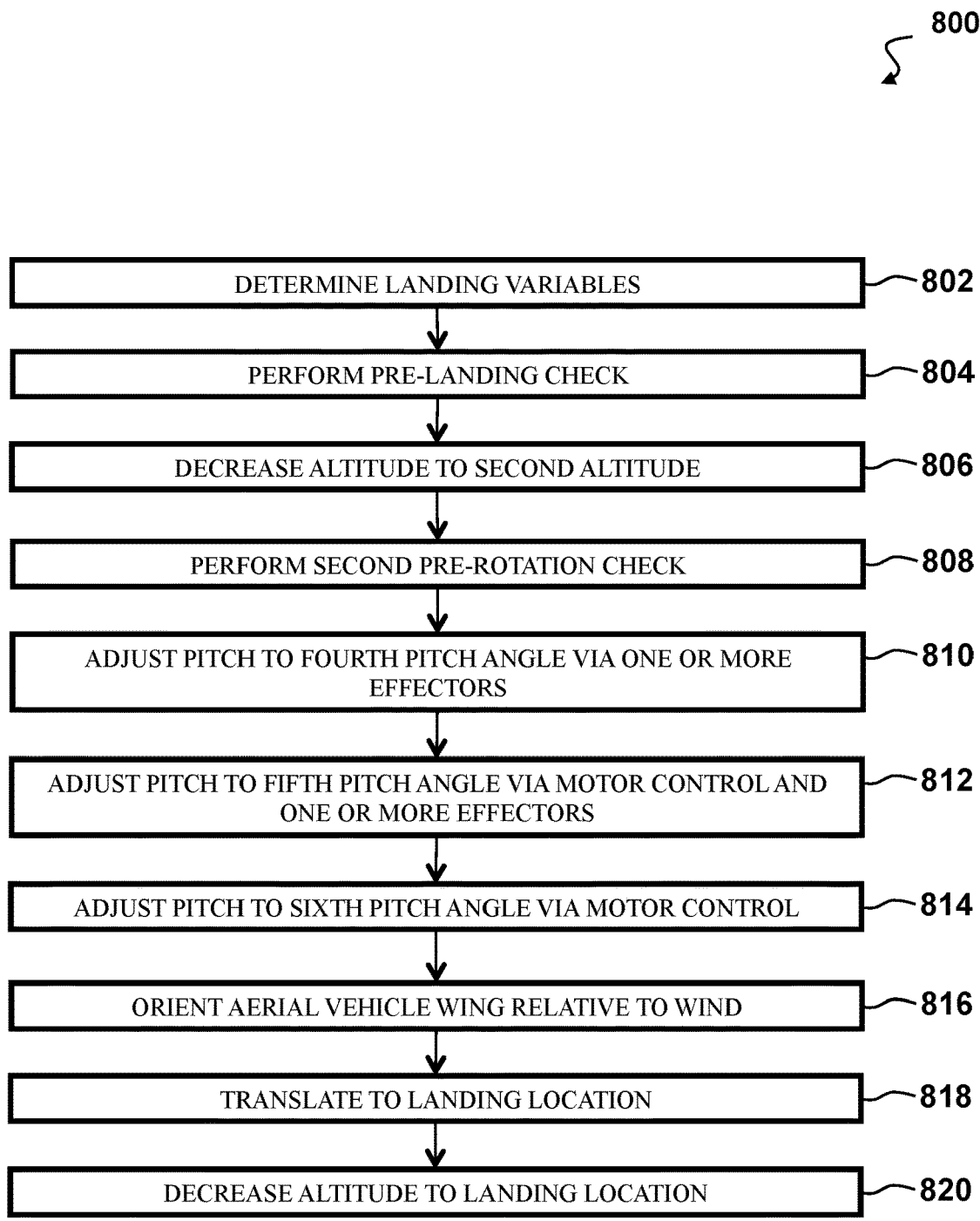
FIG. 8 depicts a flowchart of a method for transition from horizontal to vertical flight and landing for a VTOL aerial vehicle, according to one embodiment.

FIG. 8 depicts a flowchart of a method 800 for transition from horizontal to vertical flight and landing for a VTOL aerial vehicle, according to one embodiment. The method 800 may include determining one or more landing variables (step 802). Landing variables may include, but are not limited to, vertical descent speed, pitch adjustment rate, final pitch angle, horizontal descent speed, maximum transition height above ground, landing point, wind speed, and/or wind direction. The landing variables may be set by a user or operator and/or calculated by a processor of the system based on the aerial vehicle characteristics. In many embodiments, these variables may be pre-determined by the application and/or requested by the user. In certain embodiments, the user may enter these variables into the ground control system. In a number of embodiments, these variables may be determined at run time based on feedback gained from the aerial vehicle's internal sensors. In various embodiments, certain variables may not yet be determined at this stage of the process and are later determined.

The vertical descent speed is the speed at which the aerial vehicle descends in the vertical orientation. The vertical descent speed may be a maximum descent speed for the aerial vehicle from transition to landing on the ground. The pitch adjustment rate may be the rate at which the aerial vehicle can rotate from vertical to horizontal. The pitch adjustment rate may be based on the speed at which the aerial vehicle can rotate based on power applied to the one or more motors and/or movements of one or more effectors of the aerial vehicle. The pitch adjustment rate may also be based on the rate at which the aerial vehicle may decrease speed in the horizontal direction. The horizontal speed of the aerial vehicle may be about zero meters per second after transition and may be as high as about twenty meters per second prior to transition so as to be above a minimum stall speed. The pitch adjustment rate may need to ensure that horizontal speed is at or close to zero at the end of the transition or the aerial vehicle may continue to move away from a desired landing location. The final pitch angle may be the angle of the aerial vehicle in vertical flight. In some embodiments, the final pitch angle may be about perpendicular to the horizontal flight. In other embodiments, the final pitch angle may be an acute angle relative to the horizontal flight, such as in embodiments where a nose of the aerial vehicle is offset from a vertical plane when the aerial vehicle is hovering and/or in vertical flight.

The horizontal descent speed may be the speed of the aerial vehicle in horizontal flight. The maximum transition height above ground may be a set altitude above the ground or mean sea level (MSL) at which the aerial vehicle begins the transition from horizontal flight to hovering or vertical flight. The maximum transition height may be based on safety considerations, aerial vehicle geometry, energy usage, rules and regulations, and the like.

The landing point may be the landing location of the aerial vehicle. In some embodiments, the landing point may be the same as, or close to, the take-off location. In other embodiments, the landing point may be disposed distal from the take-off location. The wind speed may be a speed of wind. The wind direction may be a direction of the wind. The wing of the aerial vehicle may act as a sail and so orientation of the wing may allow for an increased and/or decreased pitch adjustment rate. The wind direction and speed may also influence the position of the aerial vehicle and may be used to orient the aerial vehicle such that the aerial vehicle moves towards a desired target, such as a field to be imaged, and/or away from an undesired target, such as above a restricted flying area, telephone poles, or other hazards or potential hazards.

The method 800 may then include performing a pre-landing check (step 804). The processor may check the motors, battery level, control surfaces, and the like prior to transitioning from horizontal flight to vertical flight. If an error is detected, the processor may initiate an alternative transition and/or landing of the aerial vehicle. For example, if a battery level is too low to safely land at the set height, the processor may adjust the height to a level that would enable a safe landing, incorporate wind speed and direction to create a transition that reduces power usage, send a notice to a ground control station so that a user or operator may take action, or the like. In some embodiments, the method 800 may not include a pre-landing check. In other embodiments, the pre-landing check may be incorporated into other safety systems of the aerial vehicle, such as a repeated or continual check of the aerial vehicle systems, battery state of charge, or the like.

The method 800 may then decrease altitude to a second altitude (step 806). The altitude decrease may be in horizontal flight. In some embodiments, the second altitude be the same or similar to the first altitude. The second altitude may be the altitude reached by the aerial vehicle prior to transitioning from horizontal flight to vertical flight.

The method 800 may then perform a second pre-rotation check (step 808). The second pre-rotation check. The processor may check the motors, battery level, control surfaces, and the like prior to transitioning from horizontal flight to vertical flight. If an error is detected, the processor may initiate an alternative transition and/or landing of the aerial vehicle. For example, if a battery level is too low to safely land at the set height, the processor may adjust the height to a level that would enable a safe landing, incorporate wind speed and direction to create a transition that reduces power usage, send a notice to a ground control station so that a user or operator may take action, or the like. In some embodiments, the method 800 may not include a second pre-rotation check. In other embodiments, the pre-rotation check may be incorporated into other safety systems of the aerial vehicle, such as a repeated or continual check of the aerial vehicle systems, battery state of charge, or the like.

The method 800 may then include adjusting pitch to a fourth pitch angle via one or more effectors (step 810). The processor may use controls to one or more effectors to control rotation of the aerial vehicle. The use of effectors may provide greater control when the vehicle is almost in horizontal flight. In some embodiments, the fourth pitch angle may correspond to the second pitch angle. In some embodiments, the processor may turn the aerial vehicle such that it is traveling into a headwind or tailwind prior to adjusting the pitch. A headwind may cause the wing of the aerial vehicle to act like a sail, decrease the speed of the aerial vehicle, and decrease the time needed to reach the fourth pitch angle. A tailwind may cause the wing of the aerial vehicle to act like a sail, increase the speed of the aerial vehicle, and increase the time needed to reach the fourth pitch angle.

The method 800 may then include adjusting the pitch to a fifth pitch angle via motor control and one or more effectors (step 812). From the fourth pitch angle to the fifth pitch angle, the processor may use a blend of controlling thrust to the one or more motors and controlling movement of one or more effectors, such as ailerons, elevons, or the like. The fifth pitch angle may correspond to the first pitch angle.

The method 800 may then include adjusting the pitch angle to a sixth pitch angle via motor control (step 814). The sixth pitch angle may be substantially parallel to a vertical plane and substantially perpendicular to a horizontal plane and/or the third pitch angle. The processor may command the one or more motors to adjust their thrust in order to cause a rotation of the aerial vehicle. For example, in the aerial vehicle shown in FIG. 2, the processor may send one or more commands to pitch the aerial vehicle pitches backward toward the sixth pitch angle by increasing a bottom thrust produced by the top motors and decreasing a top thrust produced by the bottom motors. In some embodiments, the use of control surfaces may be ineffective at rotating the aerial vehicle from vertical flight to the first pitch angle. In some embodiments, only motor control may be used to rotate the aerial vehicle. In some embodiments, the amount of blending and/or use of blending of the motor control and effector control may depend on the aerial vehicle characteristics. In one embodiment, the fourth pitch angle may be about thirty degrees from horizontal, the fifth pitch angle may be about sixty degrees from horizontal, and the sixth pitch angle may be about ninety degrees from horizontal. The sixth pitch angle may substantially correspond to vertical flight and/or hovering.

Once the aerial vehicle is in vertical flight and/or hovering, the method 800 may include orienting the aerial vehicle relative to the wind (step 816). The processor may command the one or more motors and/or effectors such that a plane corresponding to the wing of the aerial vehicle is substantially perpendicular to a wind direction. This wing orientation minimizes impact of wind on the wing and reduces the likelihood of the aerial vehicle being moved off course by the wind. In some embodiments, the aerial vehicle may not be oriented relative to the wind, such as when the battery state of charge is low and the priority is to land the aerial vehicle as soon as possible.

The method 800 may then include translating the aerial vehicle to the landing location (step 818). Transitioning from horizontal to vertical flight and/or orienting the aerial vehicle relative to the wind may have caused the aerial vehicle to move off from a desired landing location. The processor may command the one or more motors and/or effectors to translate the aerial vehicle to the landing location. The processor may send additional commands to correct the course of the aerial vehicle if wind, or other factors, cause the aerial vehicle to move from the desired landing location.

The method 800 may then include decreasing altitude to the landing location (step 820). The processor may send commands to the one or more motors and/or effectors to decrease altitude of the aerial vehicle and land the aerial vehicle at the landing location.

FIG. 9 illustrates a top-level functional block diagram of a computing device embodiment of an imaging system. The embodiment 900 is shown as a computing device 920 having a processor 924, such as a central processing unit (CPU), addressable memory 927, an external device interface 926, e.g., an optional universal serial bus port and related processing, and/or an Ethernet port and related processing, and an optional user interface 929, e.g., an array of status lights and one or more toggle switches, and/or a display, and/or a keyboard and/or a pointer-mouse system and/or a touch screen. Optionally, the addressable memory 927 may for example be: flash memory, eprom, and/or a disk drive or other hard drive. These elements may be in communication with one another via a data bus 928. The processor 924 may have an operating system 925 such as one supporting a web browser 923 and/or applications 922, which may be configured to execute steps of a process according to the embodiments described herein.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention herein disclosed by way of examples should not be limited by the particular disclosed embodiments described above.

What is claimed is:

1. A method, comprising:
   determining, by a processor having addressable memory, a set of take-off variables for a vertical take-off and landing (VTOL) aerial vehicle, wherein each take-off variable of the set of take-off variables includes at least a vertical ascent speed, a pitch adjustment rate, a final pitch angle, a horizontal ascent speed, a minimum transition height above ground, a final altitude, a minimum airspeed for horizontal flight, a wind speed, and a wind direction, and determining the set of take-off variables comprises at least:
      determining the minimum transition height above ground based on at least geometry of the VTOL aerial vehicle;
      determining the minimum airspeed for horizontal flight based on a stall speed of the VTOL aerial vehicle; and
      determining the vertical ascent speed based on a maximum ascent speed of the VTOL aerial vehicle;
   increasing, by the processor, an altitude of the VTOL aerial vehicle to a first altitude based on the determined set of take-off variables, wherein increasing the altitude comprises:
      sending a signal to one or more motors to produce thrust; and
      adjusting speed of the one or more motors such that the altitude of the VTOL aerial vehicle reaches the first altitude and vertical flight of the VTOL aerial vehicle;
   performing, by the processor, a first pre-rotation check of the VTOL aerial vehicle after increasing the altitude of the VTOL aerial vehicle to the first altitude;
   adjusting, by the processor, a pitch of the VTOL aerial vehicle to a first pitch angle via motor control based on a result of the first pre-rotation check of the VTOL aerial vehicle and the determined set of take-off variables;
   adjusting, by the processor, the pitch of the VTOL aerial vehicle from the first pitch angle to a second pitch angle via at least one of: motor control and one or more control surfaces based on the determined set of take-off variables;
   adjusting, by the processor, the pitch of the VTOL aerial vehicle from the second pitch angle to a third pitch angle via the one or more control surfaces based on the determined set of take-off variables, wherein the pitch of the VTOL aerial vehicle is adjusted to the third pitch angle until the pitch of the VTOL aerial vehicle reaches the third pitch angle, and wherein the third pitch angle is perpendicular to a vertical plane;
   verifying, by the processor, that the VTOL aerial vehicle has been travelling at a speed greater than or equal to the minimum airspeed for horizontal flight for a predetermined time interval; and
   determining, by the processor, that the VTOL aerial vehicle has completed a transition from a hover mode to an airplane mode based on the verification.

2. The method of claim 1, further comprising, prior to increasing altitude to the first altitude:
   performing, by the processor, a pre-launch check of the VTOL aerial vehicle, wherein the pre-launch check comprises a test of at least one of: the one or more motors and one or more batteries.

3. The method of claim 2, wherein the first pre-rotation check comprises a test of at least one of: the one or more motors, the one or more batteries, and a speed of the VTOL aerial vehicle.

4. The method of claim 2, further comprising:
   landing, by the processor, the VTOL aerial vehicle via adjusting thrust to the one or more motors if the test of at least one of: the one or more motors, the one or more batteries, and a speed of the VTOL aerial vehicle is failed.

5. The method of claim 1, wherein adjusting the pitch to the first pitch angle comprises adjusting thrust to the one or more motors to cause a rotation of the VTOL aerial vehicle.

6. The method of claim 5, wherein adjusting the pitch to the second pitch angle comprises adjusting thrust to the one or more motors and adjusting a position of the one or more control surfaces to cause the rotation of the VTOL aerial vehicle.

7. The method of claim 6, wherein adjusting the pitch to the third pitch angle comprises adjusting the position of the one or more control surfaces to cause the rotation of the VTOL aerial vehicle.

8. The method of claim 1, further comprising:
   performing, by the processor, a stability check of the VTOL aerial vehicle, wherein the stability check verifies that the VTOL aerial vehicle is stable prior to performing one or more maneuvers.

9. The method of claim 8, further comprising:
   executing, by the processor, one or more mission plans, wherein the one or more mission plans comprise at least one of: increasing elevation, decreasing elevation, and imaging one or more fields.

10. The method of claim 1, further comprising:
    determining, by the processor, one or more landing variables for the VTOL aerial vehicle, wherein the one or more landing variables comprise at least one of: a vertical descent speed, the pitch adjustment rate, the final pitch angle, a horizontal descent speed, a maximum transition height above ground, a landing point, the wind speed, and the wind direction.

11. The method of claim 10, further comprising:
    decreasing, by the processor, altitude of the VTOL aerial vehicle to a second altitude, wherein decreasing the altitude comprises sending a signal to at least one of: the one or more motors to produce thrust and the one or more control surfaces to change position;
    adjusting, by the processor, the pitch of the VTOL aerial vehicle to a fourth pitch angle via the one or more control surfaces, wherein adjusting the pitch to the fourth pitch angle comprises adjusting the position of the one or more control surfaces to cause a rotation of the VTOL aerial vehicle;
    adjusting, by the processor, the pitch of the VTOL aerial vehicle to a fifth pitch angle via at least one of: motor control and one or more control surfaces, wherein adjusting the pitch to the fifth pitch angle comprises adjusting thrust to the one or more motors and adjusting a position of the one or more control surfaces to cause the rotation of the VTOL aerial vehicle; and adjusting, by the processor, the pitch of the VTOL aerial vehicle to a sixth pitch angle via motor control, wherein adjusting the pitch to the sixth pitch angle comprises adjusting thrust to the one or more motors to cause the rotation of the VTOL aerial vehicle, wherein the sixth pitch angle is perpendicular to a horizontal plane.

12. The method of claim 11, further comprising:

orienting, by the processor, a wing of the VTOL aerial vehicle relative to a wind direction, wherein orienting the wing of the VTOL aerial vehicle comprises adjusting thrust to the one or more motors, and wherein a plane corresponding to the wing of the VTOL aerial vehicle is oriented perpendicular to the wind direction.

13. The method of claim 12, further comprising:

translating, by the processor, the VTOL aerial vehicle to a landing location, wherein translating the VTOL aerial vehicle comprises adjusting thrust to the one or more motors; and decreasing, by the processor, the altitude of the VTOL aerial vehicle to the landing location, wherein decreasing the altitude of the VTOL aerial vehicle comprises adjusting thrust to the one or more motors.

14. A system comprising:

a vertical take-off and landing (VTOL) aerial vehicle, the VTOL aerial vehicle comprising:
one or more motors;
one or more control surfaces; and
a processor having addressable memory, the processor in communication with the one or more motors and the one or more control surfaces, the processor configured to:
determine a set of take-off variables for the VTOL aerial vehicle, wherein each take-off variable of the set of take-off variables includes at least a vertical ascent speed, a pitch adjustment rate, a final pitch angle, a horizontal ascent speed, a minimum transition height above ground, a final altitude, a minimum airspeed for horizontal flight, a wind speed, and a wind direction, and determining the set of take-off variables comprises at least:
determine the minimum transition height above ground based on at least geometry of the VTOL aerial vehicle;
determine the minimum airspeed for horizontal flight based on a stall speed of the VTOL aerial vehicle; and
determine the vertical ascent speed based on a maximum ascent speed of the VTOL aerial vehicle;
increase an altitude of the VTOL aerial vehicle to a first altitude based on the determined set of take-off variables, wherein increasing the altitude comprises:
sending a signal to the one or more motors to produce thrust; and
adjusting speed of the one or more motors such that the altitude of the VTOL aerial vehicle reaches the first altitude and vertical flight of the VTOL aerial vehicle;
perform a first pre-rotation check of the VTOL aerial vehicle after increasing the altitude of the VTOL aerial vehicle to the first altitude;
adjust a pitch of the VTOL aerial vehicle to a first pitch angle via motor control based on a result of the first pre-rotation check of the VTOL aerial vehicle and the determined set of take-off variables;
adjust the pitch of the VTOL aerial vehicle from the first pitch angle to a second pitch angle via at least one of: motor control of the one or more motors and control of the one or more control surfaces based on the determined set of take-off variables;
adjust the pitch of the VTOL aerial vehicle from the second pitch angle to a third pitch angle via the one or more control surfaces, wherein the pitch of the VTOL aerial vehicle is adjusted to the third pitch angle until the pitch of the VTOL aerial vehicle reaches the third pitch angle, and wherein the third pitch angle is perpendicular to a vertical plane;
verify that the VTOL aerial vehicle has been travelling at a speed greater than or equal to the minimum airspeed for horizontal flight for a predetermined time interval; and
determine that the VTOL aerial vehicle has completed a transition from a hover mode to an airplane mode based on the verification.

15. The system of claim 14, wherein the VTOL aerial vehicle is an unmanned aerial vehicle.

16. The system of claim 14, wherein the processor is further configured to:

decrease altitude of the VTOL aerial vehicle to a second altitude, wherein decreasing the altitude comprises sending a signal to at least one of: the one or more motors to produce thrust and the one or more control surfaces to change position;

adjust the pitch of the VTOL aerial vehicle to a fourth pitch angle via the one or more control surfaces, wherein adjusting the pitch to the fourth pitch angle comprises adjusting the position of the one or more control surfaces to cause a rotation of the VTOL aerial vehicle;

adjust the pitch of the VTOL aerial vehicle to a fifth pitch angle via at least one of: motor control and one or more control surfaces, wherein adjusting the pitch to the fifth pitch angle comprises adjusting thrust to the one or more motors and adjusting a position of the one or more control surfaces to cause the rotation of the VTOL aerial vehicle; and adjust the pitch of the VTOL aerial vehicle to a sixth pitch angle via motor control, wherein adjusting the pitch to the sixth pitch angle comprises adjusting thrust to the one or more motors to cause the rotation of the VTOL aerial vehicle, wherein the sixth pitch angle is perpendicular to a horizontal plane.

* * * * *